(12) United States Patent
Low et al.

(10) Patent No.: US 12,473,264 B2
(45) Date of Patent: Nov. 18, 2025

(54) INHIBITORS OF ERYTHROCYTE BAND 3 TYROSINE PHOSPHORYLATION AND USES THEREOF

(71) Applicant: Purdue Research Foundation, West Lafayette, IN (US)

(72) Inventors: Philip Stewart Low, West Lafayette, IN (US); Daniel A. Sheik, Lafayette, IN (US); Som Dutt, Shamli Uttar (IN)

(73) Assignee: Purdue Research Foundation, West Lafayette, IN (US)

( * ) Notice: Subject to any disclaimer, the term of this patent is extended or adjusted under 35 U.S.C. 154(b) by 981 days.

(21) Appl. No.: 17/620,043

(22) PCT Filed: Jun. 18, 2020

(86) PCT No.: PCT/US2020/038491
§ 371 (c)(1),
(2) Date: Dec. 16, 2021

(87) PCT Pub. No.: WO2020/257495
PCT Pub. Date: Dec. 24, 2020

(65) Prior Publication Data
US 2022/0388968 A1    Dec. 8, 2022

Related U.S. Application Data

(60) Provisional application No. 62/862,743, filed on Jun. 18, 2019.

(51) Int. Cl.
| C07D 403/12 | (2006.01) |
| A61P 7/06 | (2006.01) |
| C07D 239/48 | (2006.01) |

(52) U.S. Cl.
CPC .............. *C07D 239/48* (2013.01); *A61P 7/06* (2018.01); *C07D 403/12* (2013.01)

(58) Field of Classification Search
CPC .................................................. C07D 403/12
See application file for complete search history.

(56) References Cited

U.S. PATENT DOCUMENTS

| 6,235,746 B1 * | 5/2001 | Davis ................... C07D 401/04 544/323 |
| 7,825,116 B2 | 11/2010 | Singh et al. |
| 8,338,439 B2 | 12/2012 | Singh et al. |
| 2010/0158921 A1 | 6/2010 | Bhamidipati et al. |

FOREIGN PATENT DOCUMENTS

WO    WO-2020257495 A1    12/2020

OTHER PUBLICATIONS

"International Application Serial No. PCT/US2020/038491, International Search Report mailed Nov. 5, 2020", 4 pgs.
"International Application Serial No. PCT/US2020/038491, Invitation to Pay Additional Fees and Partial Search Report mailed Sep. 8, 2020", 2 pgs.
"International Application Serial No. PCT/US2020/038491, Written Opinion mailed Nov. 5, 2020", 6 pgs.
"PubChem-CID-137946238", (Apr. 26, 2019).

* cited by examiner

*Primary Examiner* — Brian E McDowell
(74) *Attorney, Agent, or Firm* — Schwegman Lundberg & Woessner, P.A.

(57) ABSTRACT

Inhibitors of erythrocyte band 3 tyrosine phosphorylation of formula (I), and pharmaceutical salts thereof, are described:

wherein $R^1$-$R^3$ are defined herein. Compositions comprising compounds of the formula (I), and methods of using the compounds and compositions comprising the compounds to treat sickle cell diseases are also described.

8 Claims, 11 Drawing Sheets

A)

B)

C)

D)

A)

B)

INHIBITORS OF ERYTHROCYTE BAND 3 TYROSINE PHOSPHORYLATION AND USES THEREOF

CROSS REFERENCE TO RELATED APPLICATION

This application is a U.S. national stage filing under 35 U.S.C. 371 from International Application No. PCT/US2020/038491, filed on 18 Jun. 2020, and published as WO 2020/257495 on 24 Dec. 2020, which claims priority to U.S. provisional patent application No. 62/862,743, which was filed on Jun. 18, 2019, and which are hereby incorporated by reference in their entireties.

STATEMENT OF GOVERNMENT SUPPORT

This invention was made with government support under Contract No. GM024417 awarded by the National Institutes of Health. The government has certain rights in the invention.

TECHNICAL FIELD

This disclosure relates to inhibitors of erythrocyte band 3 tyrosine phosphorylation, compositions comprising same, and methods of use.

BACKGROUND

Sickle cell disease (SCD) remains a unique health problem throughout the world today. Globally, millions are believed to be affected by SCD with an estimated 300,000 babies born with the disease annually, with three-fourths of the births occurring in sub-Saharan Africa. The Centers for Disease Control (CDC) reports that approximately 100,000 Americans suffer from SCD, primarily those who have ancestry from the continent of Africa. The average life expectancy in the U.S. is approximately 40 years, whereas in Africa fewer than 50% of children diagnosed with SCD survive beyond their 5$^{th}$ birthday.

This high mortality is attributed to a lack of diagnostic techniques for early SCD detection, a dearth of therapeutic options to mitigate disease consequences, and opportunistic infections (e.g., pneumonia, meningitis, bacterial infections, and malaria) that can kill patients with compromised immune systems. While therapeutic interventions are readily available in most developed countries, life expectancy is still only ~45 years and quality of life remains compromised due to frequent vaso-occlusive crises, progressive organ damage, recurring mini-strokes, chronic pain, and addiction to narcotics (e.g., opioids) that arises from efforts to relieve pain. With over 100,000 people still suffering from SCD in the USA, the need to find a simple and effective therapy remains critical.

While most symptoms of SCD are thought to be caused by occlusion of the microvasculature, the mechanisms underpinning these vaso-occlusive events remain heavily debated. Included among the most cited mechanisms are: 1) loss of erythrocyte viscoelastic properties deriving from sickle hemoglobin (HbS) polymerization, membrane sickling, red blood cell (RBC) dehydration, and membrane rigidification, 2) activation of adhesion receptors on the vascular endothelium and/or erythrocyte membrane, and 3) initiation of thrombosis induced by RBC membrane-derived microparticles (MPs) and the subsequent activation of platelets by thrombin and other coagulation factors. When extensively disseminated throughout a tissue, these vaso-occlusive processes can cause deprivation of oxygen and essential nutrients, ischemia-reperfusion injury, organ damage/failure and associated morbidities, and extreme pain that requires undesirable use of narcotics, blood transfusions and hospitalizations. The anemia arising from the reduced sickle cell lifespan can further aggravate these clinical consequences of SCD.

While RBC dehydration, loss of membrane deformability and increased RBC/endothelial cell adhesion undoubtedly contribute to SCD, an increasing number of workers now hypothesize that additional disease sequelae must arise from weakening of the erythrocyte membrane leading to discharge of MPs and the accompanying escape of hemoglobin into the bloodstream. In this hypothesis, accelerated denaturation of HbS$^{64}$ is envisioned to lead to formation of hemichromes and release of heme that induce an oxidative stress within the RBC. The elevated oxidative stress then causes inhibition of RBC tyrosine phosphatases, which must remain active to prevent constitutive phosphorylation of Band 3 on tyrosine residues 8, 21, 359, and 904. Upon inhibition of these phosphatases, the resulting over-phosphorylation of Band 3 then induces global destabilization of the erythrocyte membrane, leading to the aforementioned intravascular hemolysis and MP release. As noted by others, the increase in intravascular free hemoglobin can promote both activation of the vascular endothelium to express adhesion receptors (e.g., p-selectin, E-selectin and von Willebrand factor) and sequestration of nitric oxide (NO) to prevent vasodilation, while the release of MPs can trigger intravascular thrombosis via activation of prothrombin. When initiated concomitantly with loss of RBC deformability and enhanced vaso-adhesion, the sequelae associated with membrane weakening are hypothesized to aggravate an already compromised blood flow, leading to eventual microembolisms, tissue damage and organ failure.

Imatinib has been reported to treat the symptoms of SCD. However, it has also been found to stunt the growth of children who use it. Therefore, imatinib cannot be taken chronically by youth. Thus, a tyrosine kinase inhibitor for treatment of SCD must not only block phosphorylation of Band 3, but also avoid inhibiting the major growth factor receptors responsible for patient growth.

Fostamatinib is a potent Syk inhibitor currently in use for treatment of chronic immune thrombocytopenia, rendering it a logical starting point for the development of a highly selective Syk-specific tyrosine kinase inhibitor. While the active version of fostamatinib, R406, displays an IC$_{50}$ for Syk of 59 nM, R406 also inhibits the activity of several growth factor receptors at concentrations equal to or lower than its IC$_{50}$ against Syk. Moreover, similar analysis of imatinib have revealed even worse specificity for Syk. (FIGS. 7-8).

There remains a need to develop a feasible therapeutic agent to tackle SCD in both adults and children, such as a Syk-specific inhibitor that blocks RBC membrane destabilization without suppressing youth growth. It is an object of the present disclosure to provide such a therapeutic agent. This and other objects and advantages will be apparent from the description provided herein.

SUMMARY

Provided is a compound of Formula (I):

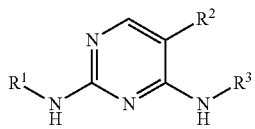

wherein:

R¹ is substituted or unsubstituted aryl, or substituted or unsubstituted heteroaryl;
R² is halogen; and
R³ is substituted phenyl or —C(O)-substituted phenyl;
or a pharmaceutically acceptable salt thereof.

Further provided is a pharmaceutical composition comprising a compound of Formula (I) and a pharmaceutically acceptable carrier.

Still further provided is a method of treating a sickle cell disease (SCD). In one embodiment, the method comprises administering a compound of Formula (I) to a subject suffering from SCD. In another embodiment, the method comprises inhibiting erythrocyte band 3 tyrosine phosphorylation with (i) a compound having a first affinity of less than 1 μM measured by $IC_{50}$ for inhibition of an erythrocyte band 3 tyrosine kinase and a second affinity measured by $IC_{50}$ for inhibition of growth factor receptor kinases, wherein the second affinity is at least five times lower than the first affinity, or (ii) a pharmaceutical composition thereof.

BRIEF DESCRIPTION OF THE FIGURES

In FIG. 3A, a general anti-pY antibody was used to show phosphorylated Band 3. Actin was used as a loading control. FIGS. 3B and 3C are triplicate measurements plotted as mean±SEM and analyzed using one-way ANOVA followed by Tukey's post test. p<0.01, *p<0.001.

DETAILED DESCRIPTION

Figure 1A:
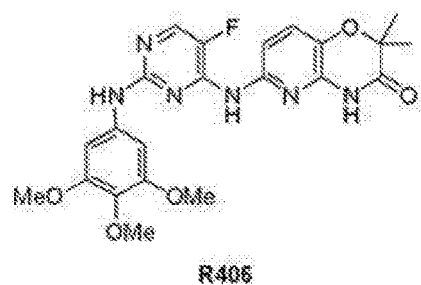
FIG. 1A is the structure of the known Syk inhibitor R406.

The disclosure provides compounds that selectively inhibit erythrocyte band 3 tyrosine phosphorylation over a growth factor receptor tyrosine kinase. The compounds are useful for the treatment of sickle cell disease.

Definitions

For convenience, before further description of the present disclosure, some terms employed in the specification, examples and appended claims are collected here. These definitions should be read in light of the remainder of the disclosure and understood as by a person of skill in the art. Unless defined otherwise, all technical and scientific terms used herein have the same meaning as commonly understood by a person of ordinary skill in the art.

In order for the present disclosure to be more readily understood, some terms and phrases are defined below and throughout the specification.

The articles "a" and "an" are used herein to refer to one or to more than one (i.e., to at least one) of the grammatical object of the article. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer to A only (optionally including elements other than B); or to B only (optionally including elements other than A); or yet, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, to at least one, optionally including more than one, A, with no B present (and optionally including elements other than B); or to at least one, optionally including more than one, B, with no A present (and optionally including elements other than A); or yet, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to.

As used herein, "band 3 tyrosine kinase" refers to any tyrosine kinase that phosphorylates the erythrocyte membrane protein that is termed band 3. A band 3 tyrosine kinase can phosphorylate erythrocyte membrane protein on tyrosine residue 8, 21, 359 or 904.

Various compounds contained in compositions of the present disclosure may exist in particular geometric or stereoisomeric forms. In addition, polymers of the present disclosure may also be optically active. The present disclosure contemplates all such compounds, including cis- and trans-isomers, R- and S-enantiomers, diastereomers, (D)-isomers, (L)-isomers, the racemic mixtures thereof, and other mixtures thereof, as falling within the scope of the disclosure. Additional asymmetric carbon atoms may be present in a substituent such as an alkyl group. All such isomers, as well as mixtures thereof, are intended to be included in this disclosure.

If, for instance, a particular enantiomer of compound of the present disclosure is desired, it may be prepared by asymmetric synthesis, or by derivation with a chiral auxiliary, where the resulting diastereomeric mixture is separated and the auxiliary group cleaved to provide the pure desired enantiomers. Alternatively, where the molecule contains a basic functional group, such as amino, or an acidic functional group, such as carboxyl, diastereomeric salts are formed with an appropriate optically-active acid or base, followed by resolution of the diastereomers thus formed by fractional crystallization or chromatographic means well known in the art, and subsequent recovery of the pure enantiomers.

Structures depicted herein are also meant to include compounds that differ only in the presence of one or more isotopically enriched atoms. For example, compounds produced by the replacement of a hydrogen with deuterium or tritium, or of a carbon with a $^{13}C$- or $^{14}C$-enriched carbon are within the scope of this disclosure.

The term "prodrug" as used herein encompasses compounds that, under physiological conditions, are converted into therapeutically active agents. A common method for making a prodrug is to include selected moieties that are hydrolyzed under physiological conditions to reveal the desired molecule. In other embodiments, the prodrug is converted by an enzymatic activity of the host animal.

The phrase "pharmaceutically acceptable excipient" or "pharmaceutically acceptable carrier" as used herein means a pharmaceutically acceptable material, composition or vehicle, such as a liquid or solid filler, diluent, excipient, solvent or encapsulating material, involved in carrying or transporting the subject chemical from one organ or portion of the body, to another organ or portion of the body. Each carrier must be "acceptable" in the sense of being compatible with the other ingredients of the formulation, not injurious to the patient, and substantially non-pyrogenic. Some examples of materials which can serve as pharmaceutically acceptable carriers include: (1) sugars, such as lactose, glucose, and sucrose; (2) starches, such as corn starch and potato starch; (3) cellulose, and its derivatives, such as sodium carboxymethyl cellulose, ethyl cellulose, and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil, and soybean oil; (10) glycols, such as propylene glycol; (11) polyols, such as glycerin, sorbitol, mannitol, and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations. In various embodiments, pharmaceutical compositions of the present disclosure are non-pyrogenic, i.e., do not induce significant temperature elevations when administered to a patient.

The term "pharmaceutically acceptable salts" refers to the relatively non-toxic, inorganic and organic acid addition salts of the compound(s). These salts can be prepared in situ during the final isolation and purification of the compound(s), or by separately reacting a purified compound(s) in its free base form with a suitable organic or inorganic acid, and isolating the salt thus formed. Representative salts include the hydrobromide, hydrochloride, sulfate, bisulfate, phosphate, nitrate, acetate, valerate, oleate, palmitate, stearate, laurate, benzoate, lactate, phosphate, tosylate, citrate, maleate, fumarate, succinate, tartrate, naphthylate, mesylate, glucoheptonate, lactobionate, and laurylsulphonate salts, and the like. (See, for example, Berge et al. (1977) "Pharmaceutical Salts", *J Pharm. Sci.* 66:1-19.)

In other cases, the compounds useful in the methods of the present disclosure may contain one or more acidic functional groups and, thus, can form pharmaceutically acceptable salts with pharmaceutically acceptable bases. The term "pharmaceutically acceptable salts" in these instances refers to the relatively non-toxic inorganic and organic base addition salts of a compound(s). These salts can likewise be prepared in situ during the final isolation and purification of the compound(s), or by separately reacting the purified compound(s) in its free acid form with a suitable base, such as the hydroxide, carbonate, or bicarbonate of a pharmaceutically acceptable metal cation, with ammonia, or with a pharmaceutically acceptable organic primary, secondary, or tertiary amine. Representative alkali or alkaline earth salts include the lithium, sodium, potassium, calcium, magnesium, and aluminum salts, and the like. Representative organic amines useful for the formation of base addition salts include ethylamine, diethylamine, ethylenediamine, ethanolamine, diethanolamine, piperazine, and the like (see, for example, Berge et al., supra).

A "therapeutically effective amount" (or "effective amount") of a compound with respect to use in treatment, refers to an amount of the compound in a preparation which, when administered as part of a desired dosage regimen (to a mammal, such as a human) alleviates a symptom, ameliorates a condition, or slows the onset of disease conditions according to clinically acceptable standards for the disorder or condition to be treated or the cosmetic purpose, e.g., at a reasonable benefit/risk ratio applicable to any medical treatment.

The term "prophylactic or therapeutic" treatment is art-recognized and includes administration to the patient of one or more compound of the disclosure. If it is administered prior to clinical manifestation of the unwanted condition (e.g., disease or other unwanted state of the host animal) then the treatment is prophylactic, (i.e., it protects the host against developing the unwanted condition), whereas if it is administered after manifestation of the unwanted condition, the treatment is therapeutic, (i.e., it is intended to diminish, ameliorate, or stabilize the existing unwanted condition or side effects thereof).

The term "patient" or "subject" refers to a mammal suffering of a disease, disorder, or condition. In various embodiments, a patient or subject is a primate, canine, feline, or equine. In various embodiments, a patient or subject is a bird. In various embodiments, the bird is a domesticated bird, such as chicken. In various embodiments, the bird is a fowl. In various embodiments, a patient or subject is a human. A child patient or subject refers to a human of 18 years of age or less.

An aliphatic chain comprises the classes of alkyl, alkenyl and alkynyl defined below. A straight aliphatic chain is limited to unbranched carbon chain moieties. As used herein, the term "aliphatic group" refers to a straight-chain, branched-chain, or cyclic aliphatic hydrocarbon group and includes saturated and unsaturated aliphatic groups, such as an alkyl group, an alkenyl group, or an alkynyl group.

"Alkyl" refers to a fully saturated cyclic or acyclic, branched or unbranched carbon chain moiety having the number of carbon atoms specified, or up to 30 carbon atoms if no specification is made. For example, alkyl of 1 to 8 carbon atoms refers to moieties such as methyl, ethyl, propyl, butyl, pentyl, hexyl, heptyl, and octyl, and those moieties which are positional isomers of these moieties. Alkyl of 10 to 30 carbon atoms includes decyl, undecyl, dodecyl, tridecyl, tetradecyl, pentadecyl, hexadecyl, heptadecyl, octadecyl, nonadecyl, eicosyl, heneicosyl, docosyl, tricosyl and tetracosyl. In various embodiments, a straight-chain or branched-chain alkyl has 30 or fewer carbon atoms in its backbone (e.g., $C_1$-$C_{30}$ for straight chains, $C_3$-$C_{30}$ for branched chains), and in various embodiments 20 or fewer. Alkyl groups may be substituted or unsubstituted.

As used herein, the term "alkylene" refers to an alkyl group having the specified number of carbons, for example from 2 to 12 carbon atoms, that contains two points of attachment to the rest of the compound on its longest carbon chain. Non-limiting examples of alkylene groups include methylene —($CH_2$)—, ethylene —($CH_2CH_2$)—, n-propylene —($CH_2CH_2CH_2$)—, isopropylene —($CH_2CH(CH_3)$)—, and the like. Alkylene groups can be cyclic or acyclic, branched or unbranched carbon chain moiety, and may be optionally substituted with one or more substituents.

"Cycloalkyl" means mono- or bicyclic or bridged or spirocyclic, or polycyclic saturated carbocyclic rings, each having from 3 to 12 carbon atoms. In various aspects, cycloalkyls have from 3-10 carbon atoms in their ring structure, or 3-6 carbons in the ring structure. Cycloalkyl groups may be substituted or unsubstituted.

Unless the number of carbons is otherwise specified, "lower alkyl," as used herein, means an alkyl group, as defined above, but having from one to ten carbons, or from one to six carbon atoms in its backbone structure such as methyl, ethyl, n-propyl, isopropyl, n-butyl, isobutyl, sec-butyl, and tert-butyl. Likewise, "lower alkenyl" and "lower alkynyl" have similar chain lengths. In various embodiments, a substituent designated herein as alkyl is a lower alkyl.

"Alkenyl" refers to any cyclic or acyclic, branched or unbranched unsaturated carbon chain moiety having the number of carbon atoms specified, or up to 26 carbon atoms if no limitation on the number of carbon atoms is specified; and having one or more double bonds in the moiety. Alkenyl of 6 to 26 carbon atoms is exemplified by hexenyl, heptenyl, octenyl, nonenyl, decenyl, undecenyl, dodenyl, tridecenyl, tetradecenyl, pentadecenyl, hexadecenyl, heptadecenyl, octadecenyl, nonadecenyl, eicosenyl, heneicosoenyl, docosenyl, tricosenyl, and tetracosenyl, in their various isomeric forms, where the unsaturated bond(s) can be located anywhere in the moiety and can have either the (Z) or the (E) configuration about the double bond(s).

"Alkynyl" refers to hydrocarbyl moieties of the scope of alkenyl, but having one or more triple bonds in the moiety.

The term "alkylthio" refers to an alkyl group, as defined above, having a sulfur moiety attached thereto. In various embodiments, the "alkylthio" moiety is represented by one of —(S)-alkyl, —(S)-alkenyl, —(S)-alkynyl, and —(S)—(CH$_2$)$_m$-R$^1$, wherein m and R$^1$ are defined below. Representative alkylthio groups include methylthio, ethylthio, and the like. The terms "alkoxyl" or "alkoxy" as used herein refers to an alkyl group, as defined below, having an oxygen moiety attached thereto. Representative alkoxyl groups include methoxy, ethoxy, propoxy, tert-butoxy, and the like. An "ether" is two hydrocarbons covalently linked by an oxygen. Accordingly, the substituent of an alkyl that renders that alkyl an ether is or resembles an alkoxyl, such as can be represented by one of —O-alkyl, —O-alkenyl, —O-alkynyl, —O—(CH$_2$)$_m$-R$_{10}$, where m and R$_{10}$ are described below.

The terms "amine" and "amino" are art-recognized and refer to both unsubstituted and substituted amines, e.g., a moiety that can be represented by the formula:

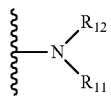

wherein R$_{11}$ and R$_{12}$ each independently represent a hydrogen, an alkyl, an alkenyl, —(CH$_2$)$_m$-R$_{10}$, or R$_{11}$ and R$_{12}$ taken together with the N atom to which they are attached complete a heterocycle having from 4 to 8 atoms in the ring structure; R$_{10}$ represents an alkenyl, aryl, cycloalkyl, a cycloalkenyl, a heterocyclyl, or a polycyclyl; and m is zero or an integer in the range of 1 to 8. In various embodiments, only one of R$_{11}$ or R$_{12}$ can be a carbonyl, e.g., R$_{11}$, R$_{12}$, and the nitrogen together do not form an imide. In various embodiments, R$_{11}$ and R$_{12}$ each independently represent a hydrogen, an alkyl, an alkenyl, or —(CH$_2$)$_m$-R$_{10}$. Thus, the term "alkylamine" as used herein means an amine group, as defined above, having a substituted or unsubstituted alkyl attached thereto, i.e., at least one of R$_{11}$ and R$_{12}$ is an alkyl group. In various embodiments, an amino group or an alkylamine is basic, meaning it has a conjugate acid with a pK$_a$>7.00, i.e., the protonated forms of these functional groups have pK$_a$s relative to water above about 7.00.

The term "amide", as used herein, refers to a group

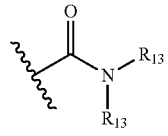

wherein each R$_{13}$ independently represent a hydrogen or hydrocarbyl group, or two R$_{13}$, taken together with the N atom to which they are attached, complete a heterocycle having from 4 to 8 atoms in the ring structure.

The term "aryl" as used herein includes 3- to 12-membered substituted or unsubstituted, single-ring aromatic groups in which each atom of the ring is carbon (i.e., carbocyclic aryl) or where one or more atoms are heteroatoms (i.e., heteroaryl). In various aspects, aryl groups include 5- to 12-membered rings, or 6- to 10-membered rings. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Carbocyclic aryl groups include benzene, naphthalene, phenanthrene, phenol, aniline, and the like. Heteroaryl groups include substituted or unsubstituted aromatic 3- to 12-membered ring structures, 5- to 12-membered rings, or 5- to 10-membered rings, whose ring structures include one to four heteroatoms. Heteroaryl groups include, for example, pyrrole, furan, thiophene, imidazole, oxazole, thiazole, triazole, pyrazole, pyridine, pyrazine, pyridazine and pyrimidine, and the like. Aryl and heteroaryl can be monocyclic, bicyclic, or polycyclic. Each instance of an aryl group may be independently optionally substituted, i.e., unsubstituted (an "unsubstituted aryl") or substituted (a "substituted aryl") with one or more substituents; e.g., for instance from 1 to 5 substituents, 1 to 4 substituents, 1 to 3 substituents, 1 to 2 substituents or just 1 substituent. The aromatic ring may be substituted at one or more ring positions with one or more substituents, such as halogen, azide, alkyl, aryl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, fluoroalkyl (such as trifluromethyl), cyano, or the like. For example, in various embodiments, the aryl group can be an unsubstituted C$_5$-C$_{12}$ aryl and in various embodiments, the aryl group can be a substituted C$_5$-C$_{10}$ aryl.

The term "halo", "halide", or "halogen" as used herein means halogen and includes, for example, and without being limited thereto, fluoro, chloro, bromo, iodo and the like, in both radioactive and non-radioactive forms. In various embodiments, halo is selected from the group consisting of fluoro, chloro and bromo.

The terms "heterocyclyl" or "heterocyclic group" refer to 3- to 12-membered ring structures, 5- to 12-membered rings, or 5- to 10-membered rings, whose ring structures include one to four heteroatoms. Heterocycles can be monocyclic, bicyclic, spirocyclic, or polycyclic. Heterocyclyl groups include, for example, thiophene, thianthrene, furan, pyran, isobenzofuran, chromene, xanthene, phenoxathiin, pyrrole, imidazole, pyrazole, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, phenanthridine, acridine, pyrimidine, phenanthroline, phenazine, phenarsazine, phenothiazine, furazan, phenoxazine, pyrrolidine, oxolane, thiolane, oxazole, piperidine, piperazine, morpholine, lactones, lactams such as azetidinones and pyrrolidinones, sultams, sultones, and the like. The heterocyclic ring can be substituted at one or more positions with such substituents as described above, as for example, halogen, alkyl, aryl, alkenyl, alkynyl, cycloalkyl, hydroxyl, amino, nitro, sulfhydryl, imino, amido, phosphate, phosphonate, phosphinate, carbonyl, carboxyl, silyl, sulfamoyl, sulfinyl, ether, alkylthio, sulfonyl, ketone, aldehyde, ester, a heterocyclyl, an aromatic or heteroaromatic moiety, —CF$_3$, —CN, and the like.

The term "carbonyl" is art-recognized and includes such moieties as can be represented by the formula:

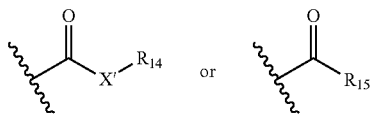

wherein X' is a bond or represents an oxygen, a nitrogen, or a sulfur, and $R_{14}$ represents a hydrogen, an alkyl, an alkenyl, —$(CH_2)_m$-$R_{10}$ or a pharmaceutically acceptable salt, $R_{15}$ represents a hydrogen, an alkyl, an alkenyl or —$(CH_2)_m$-$R_{10}$, where m and $R_{10}$ are as defined above. Where X' is an oxygen and $R_{14}$ or $R_{15}$ is not hydrogen, the formula represents an "ester." Where X' is an oxygen, and $R_{14}$ is as defined above, the moiety is referred to herein as a carboxyl group, and particularly when $R_{14}$ is a hydrogen, the formula represents a "carboxylic acid". Where X' is an oxygen, and $R_{15}$ is a hydrogen, the formula represents a "formate." In general, where the oxygen atom of the above formula is replaced by a sulfur, the formula represents a "thiocarbonyl" group. Where X' is a sulfur and $R_{14}$ or $R_{15}$ is not hydrogen, the formula represents a "thioester" group. Where X' is a sulfur and $R_{14}$ is a hydrogen, the formula represents a "thiocarboxylic acid" group. Where X' is a sulfur and $R_{15}$ is a hydrogen, the formula represents a "thioformate" group. On the other hand, where X' is a bond, and $R_{14}$ is not hydrogen, the above formula represents a "ketone" group. Where X' is a bond, and $R_{14}$ is a hydrogen, the above formula represents an "aldehyde" group.

As used herein, the term "nitro" means —$NO_2$; the term "halogen" designates —F, —Cl, —Br, or —I; the term "sulfhydryl" means —SH; the term "hydroxyl" means —OH; the term "sulfonyl" means —$SO_2$—; the term "azido" means —$N_3$; the term "cyano" means —CN; the term "isocyanato" means —NCO; the term "thiocyanato" means —SCN; the term "isothiocyanato" means —NCS; and the term "cyanato" means —OCN.

As used herein, the definition of each expression, e.g., alkyl, m, n, etc., when it occurs more than once in any structure, is intended to be independent of its definition elsewhere in the same structure.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this disclosure, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxy, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aryl, or an aromatic or heteroaromatic moiety. In various embodiments, the substituents on substituted alkyls are selected from $C_{1-6}$ alkyl, $C_{3-6}$ cycloalkyl, halogen, carbonyl, cyano, or hydroxyl. In various embodiments, the substituents on substituted alkyls are selected from fluoro, carbonyl, cyano, or hydroxyl. It will be understood by those skilled in the art that substituents can themselves be substituted, if appropriate. Unless specifically stated as "unsubstituted," references to chemical moieties herein are understood to include substituted variants. For example, reference to an "aryl" group or moiety implicitly includes both substituted and unsubstituted variants.

For purposes of this disclosure, the chemical elements are identified in accordance with the Periodic Table of the Elements, CAS version, Handbook of Chemistry and Physics, 67th Ed., 1986-87, inside cover.

Compounds

The disclosure relates to a compound of Formula (I):

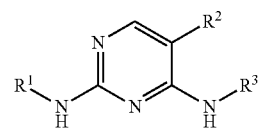

$R^1$ is substituted or unsubstituted aryl, or substituted or unsubstituted heteroaryl;

$R^2$ is halogen; and $R^3$ is substituted phenyl or —C(O)-substituted phenyl;

or a pharmaceutically acceptable salt thereof.

$R^1$ can be unsubstituted aryl. $R^1$ can be substituted aryl. $R^1$ can be phenyl. $R^1$ can be unsubstituted heteroaryl. $R^1$ can be substituted heteroaryl $R^1$ can be a bicyclic heteroaryl. $R^1$ can be substituted with 1 substituent. $R^1$ can be substituted with 2 substituents. $R^1$ can be substituted with 3 substituents. $R^1$ can be an unsubstituted indole. $R^1$ can be a substituted indole. $R^1$ can be an unsubstituted isoindole. $R^1$ can be a substituted isoindole. $R^1$ can be an unsubstituted benzimidazole. $R^1$ can be a substituted benzimidazole. $R^1$ can be substituted with alkylene-$NH_2$. $R^1$ can be substituted with ethylenediamine.

$R^1$ can be

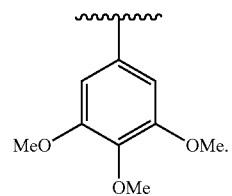

$R^1$ can be

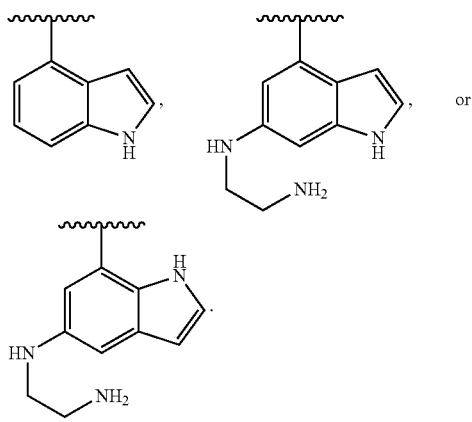

or $R^2$ can be F.

$R^3$ can be substituted phenyl. $R^3$ can be —C(O)-substituted phenyl. $R^3$ can be substituted with 2 substituents. $R^3$ can be substituted with 3 substituents.

The substituents are independently $OR^4$ or substituted phenyl, and $R^4$ can be independently H, Me, or cyclohexylamine.

$R^3$ can be

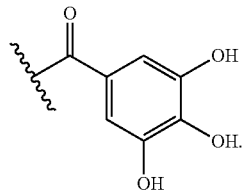

wherein $X^1$, $X^2$, are independently $NH_2$, OH, or SH and $Y^1$, $Y^2$, and $Y^3$ independently H, $NH_2$, OH, or SH, and two of $Y^1$, $Y^2$, and $Y^3$ are H.

$X^1$ can be $NH_2$. $X^1$ can be OH. $X^1$ can be SH.
$X^2$ can be $NH_2$. $X^2$ can be OH. $X^2$ can be SH.
$Y^1$ can be $NH_2$. $Y^1$ can be OH. $Y^1$ can be SH.
$Y^2$ can be $NH_2$. $Y^2$ can be OH. $Y^2$ can be SH.
$Y^3$ can be $NH_2$. $Y^3$ can be OH. $Y^3$ can be SH.

$R^3$ can be selected from

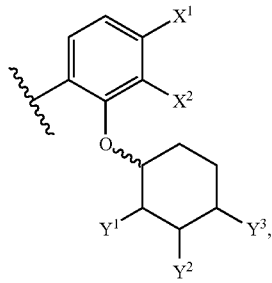

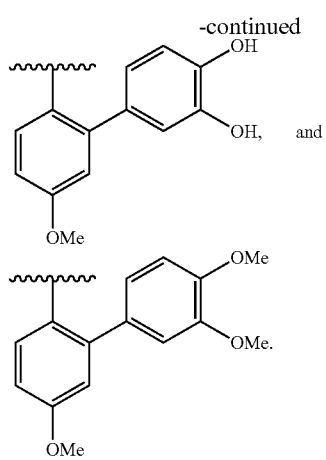

and

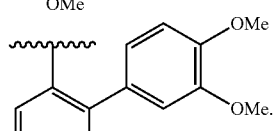

$R^3$ can be

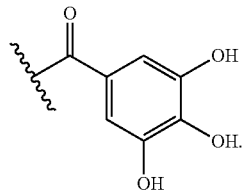 [SMILES: *C(=O)c1cc(O)c(O)c(O)c1]

The compound of formula (I) can be selected from

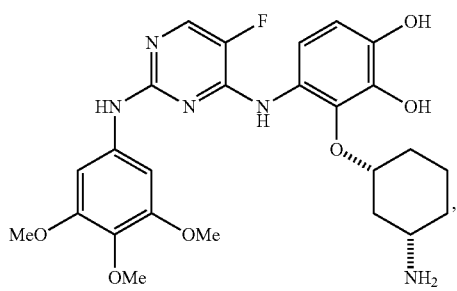

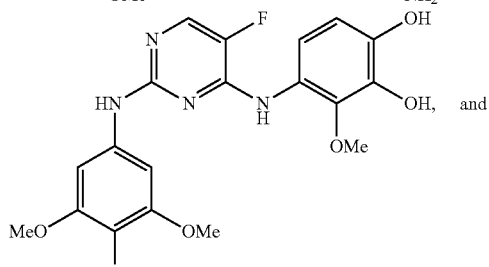

and

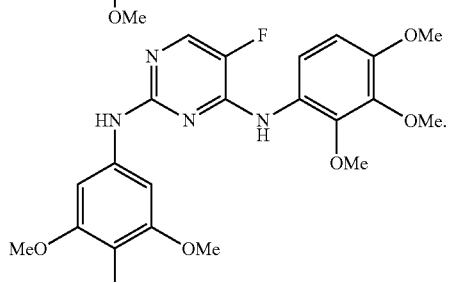

The compound of formula (I) can be selected from
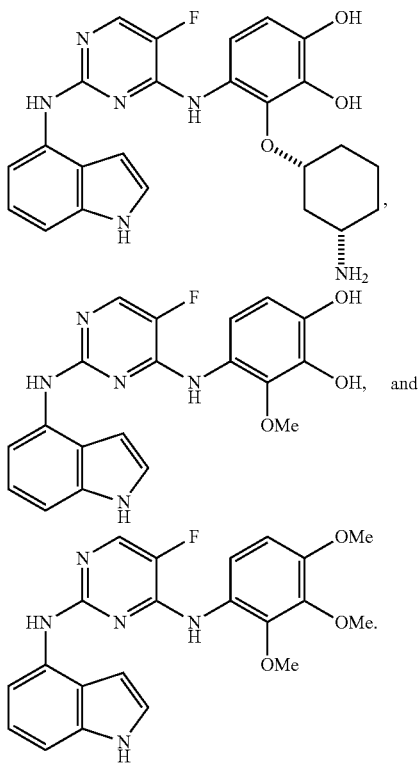
The compound of formula (I) can be selected from
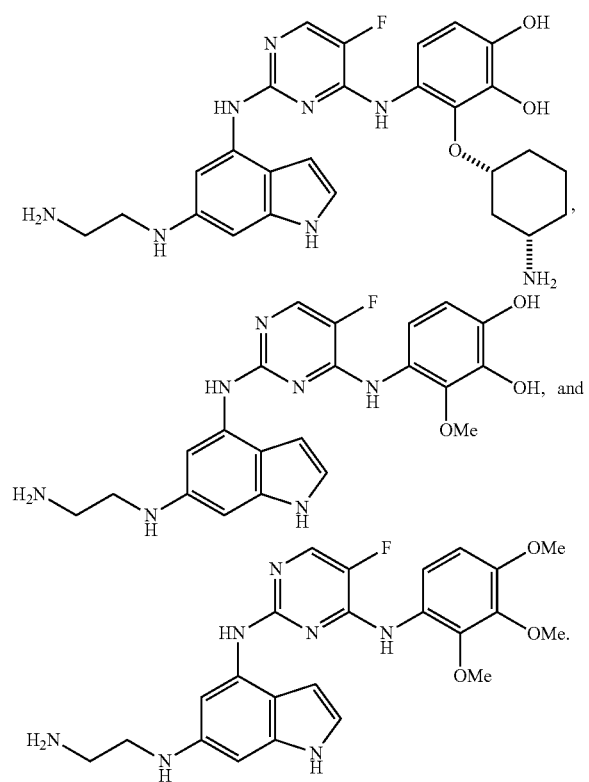
The compound of formula (I) can be selected from
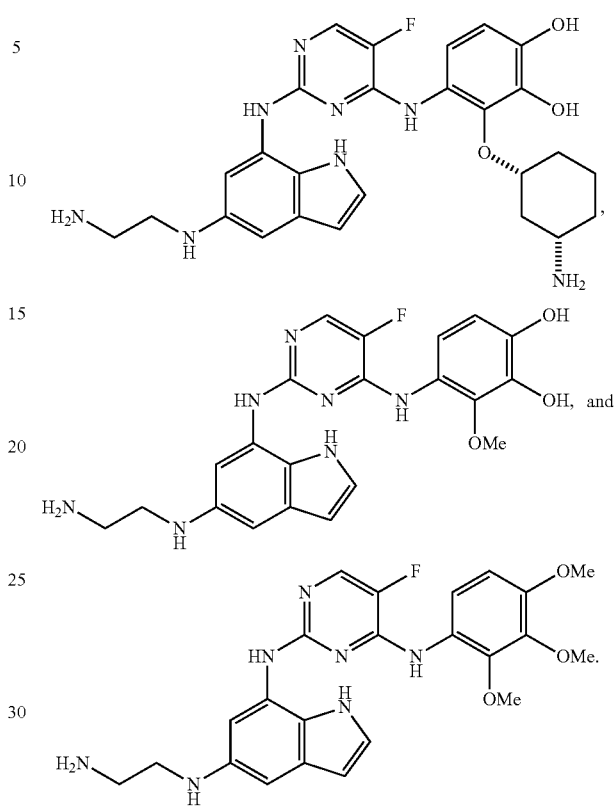
The compound of formula (I) can be
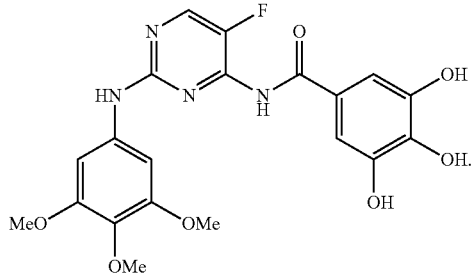 [SMILES: COc1cc(Nc2ncc(F)c(NC(=O)c3cc(O)c(O)c(O)c3)n2)cc(OC)c1OC]
The compound of formula (I) can be
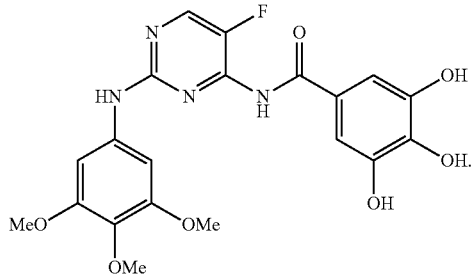 [SMILES: COc1cc(Nc2ncc(F)c(NC(=O)c3cc(O)c(O)c(O)c3)n2)cc(OC)c1OC]

The compound of formula (I) can be selected from

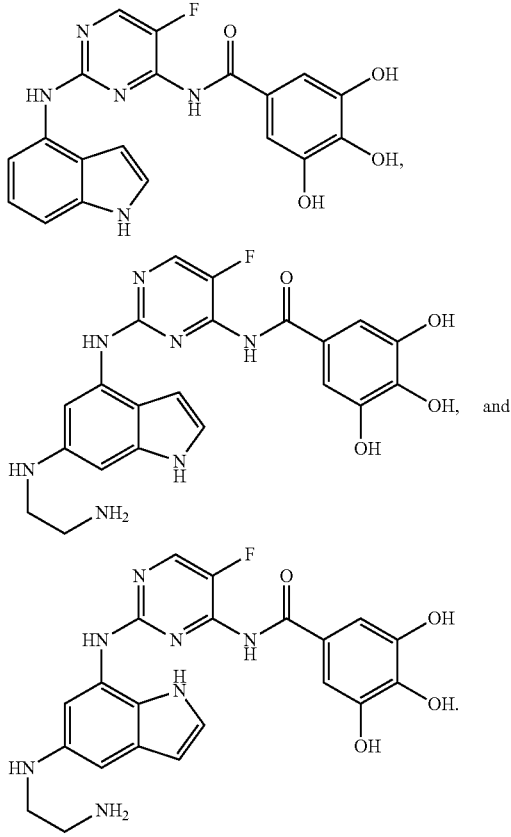

The compounds of formula (I) can be synthesized in any way known to one of ordinary skill in the art, for example as exemplified in Scheme 1.

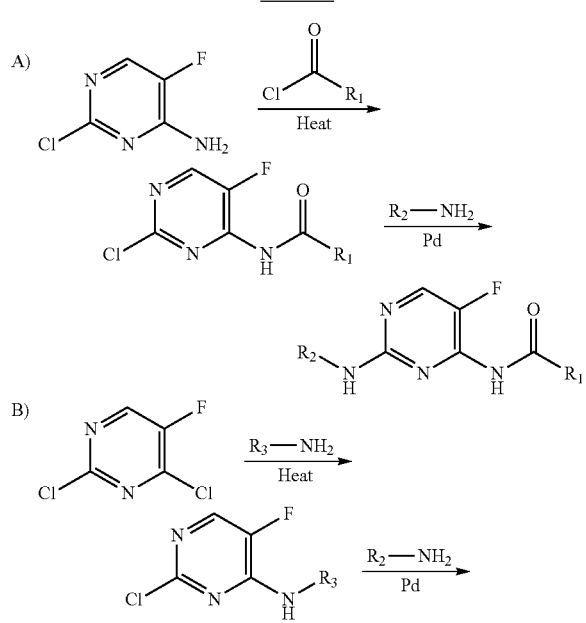

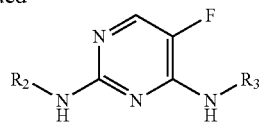

Methods of Treatment

The disclosure also relates to a method of treating sickle cell disease in a subject. In one embodiment, the method comprises administering to the subject, such as a child, a therapeutically effective amount of an above-described compound or a pharmaceutical composition comprising same and a pharmaceutically acceptable carrier. In another embodiment, the method comprises inhibiting erythrocyte band 3 tyrosine phosphorylation in the subject by administering (i) a compound having a first affinity of less than 1 μM measured by $IC_{50}$ for inhibition of an erythrocyte band 3 tyrosine kinase and a second affinity measured by $IC_{50}$ for inhibition of growth factor receptor kinases, wherein the second $IC_{50}$ is at least five times higher than the first $IC_{50}$, or (ii) a pharmaceutical composition thereof. The compound can have one or more functional groups that can occupy a cavity that is present in band 3 tyrosine kinase's ATP binding pocket but is not present in the growth factor receptor tyrosine kinases.

The compound can have at least about 15 folds to about 250 folds, such as 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, or 250, more specificity to said band 3 tyrosine kinase than to a growth factor receptor tyrosine kinase measured by said first affinity and said second affinity.

The compound can reduce hemoglobin (Hb) release into the plasma measured by plasma Hb concentration. The compound can reduce erythrocyte-derived microparticle (MP) release into the plasma compared to untreated subject. The compound can increase the subject's red blood cell (RBC) flow velocity in a micro-capillary tube in a dose-responsive manner. Desirably, the compound does not inhibit a growth factor receptor kinase. If the compound does inhibit a growth factor receptor kinase, desirably the inhibition is minimal, such that youth growth is not stunted. Examples of growth factor receptor kinases that are desirably not inhibited by the compound include, for example, epidermal growth factor recetor (EGFR), SRC proto-oncogene, non-receptor tyrosine kinase (SRC), zeta chain-associated protein kinase 70 (ZAP70), insulin-like growth factor receptor (IGFR), and LynA. Other examples of growth factor receptor kinases that are desirably not inhibited by the compound include, for example, vascular endothelial growth factor receptor (VEGFR) 2, VEGFR3, platelet-derived growth factor receptor (PDGFR) A, and PDGFR B. The compound can inhibit the spleen tyrosine kinase (SYK).

The compound can be any compound of the disclosure.

The band 3 tyrosine kinase can phosphorylate erythrocyte membrane protein on tyrosine residue 8, 21, 359 or 904. The band 3 tyrosine kinase can be SYK.

Pharmaceutical Compositions, Routes of Administration, and Dosing

Pharmaceutical compositions are also provided. In an embodiment, the pharmaceutical composition comprises a compound as described herein and a pharmaceutically acceptable carrier. In another embodiment, the pharmaceutical composition comprises a plurality of compounds as described herein and a pharmaceutically acceptable carrier. In yet another embodiment, the pharmaceutical composition comprises a prodrug of a compound described herein, alone or in further combination with one or more other compounds described herein, or prodrugs thereof, and a pharmaceutically acceptable carrier.

In some embodiments, a pharmaceutical composition of the disclosure further comprises at least one additional pharmaceutically active agent other than a compound of the disclosure. The at least one additional pharmaceutically active agent can be, for example, an agent useful in the treatment of ischemia-reperfusion injury.

Pharmaceutical compositions can be prepared by combining one or more compounds with a pharmaceutically acceptable carrier and, optionally, one or more additional pharmaceutically active agents.

As stated above, an "effective amount" refers to any amount that is sufficient to achieve a desired biological effect. Combined with the teachings provided herein, by choosing among the various active compounds and weighing factors such as potency, relative bioavailability, patient body weight, severity of adverse side-effects and mode of administration, an effective prophylactic or therapeutic treatment regimen can be planned which does not cause substantial unwanted toxicity and yet is effective to treat the particular subject. The effective amount for any particular application can vary depending on such factors as the disease or condition being treated, the particular compound of the disclosure being administered, the size of the subject, or the severity of the disease or condition. One of ordinary skill in the art can empirically determine the effective amount of a particular compound of the disclosure and/or other therapeutic agent without necessitating undue experimentation. A maximum dose may be used, that is, the highest safe dose according to some medical judgment. Multiple doses per day may be contemplated to achieve appropriate systemic levels of compounds. Appropriate systemic levels can be determined by, for example, measurement of the patient's peak or sustained plasma level of the drug. "Dose" and "dosage" are used interchangeably herein.

Generally, daily oral doses of a compound are, for human subjects, from about 0.01 milligrams/kg per day to 1000 milligrams/kg per day. Oral doses in the range of 0.5 to 50 milligrams/kg, in one or more administrations per day, can yield therapeutic results. Dosage may be adjusted appropriately to achieve desired drug levels, local or systemic, depending upon the mode of administration. For example, intravenous administration may vary from one order to several orders of magnitude lower dose per day. In the event that the response in a subject is insufficient at such doses, even higher doses (or effective higher doses by a different, more localized delivery route) may be employed to the extent that patient tolerance permits. Multiple doses per day are contemplated to achieve appropriate systemic levels of the compound.

For any compound described herein the therapeutically effective amount can be initially determined from animal models. A therapeutically effective dose can also be determined from human data for compounds which have been tested in humans and for compounds which are known to exhibit similar pharmacological activities, such as other related active agents. Higher doses may be required for parenteral administration. The applied dose can be adjusted based on the relative bioavailability and potency of the administered compound. Adjusting the dose to achieve maximal efficacy based on the methods described above and other methods are well-known in the art and well within the capabilities of the ordinarily skilled artisan.

For clinical use, any compound of the disclosure can be administered in an amount equal or equivalent to 0.2-2000 milligram (mg) of compound per kilogram (kg) of body weight of the subject per day. The compounds of the disclosure can be administered in a dose equal or equivalent to 2-2000 mg of compound per kg body weight of the subject per day. The compounds of the disclosure can be administered in a dose equal or equivalent to 20-2000 mg of compound per kg body weight of the subject per day. The compounds of the disclosure can be administered in a dose equal or equivalent to 50-2000 mg of compound per kg body weight of the subject per day. The compounds of the disclosure can be administered in a dose equal or equivalent to 100-2000 mg of compound per kg body weight of the subject per day. The compounds of the disclosure can be administered in a dose equal or equivalent to 200-2000 mg of compound per kg body weight of the subject per day. Where a precursor or prodrug of the compounds of the disclosure is to be administered rather than the compound itself, it is administered in an amount that is equivalent to, i.e., sufficient to deliver, the above-stated amounts of the compounds of the invention.

The formulations of the compounds of the disclosure can be administered to human subjects in therapeutically effective amounts. Typical dose ranges are from about 0.01 microgram/kg to about 2 mg/kg of body weight per day. The dosage of drug to be administered is likely to depend on such variables as the type and extent of the disorder, the overall health status of the particular subject, the specific compound being administered, the excipients used to formulate the compound, and its route of administration. Routine experiments may be used to optimize the dose and dosing frequency for any particular compound.

The compounds of the disclosure can be administered at a concentration in the range from about 0.001 microgram/kg to greater than about 500 mg/kg. For example, the concentration may be 0.001 microgram/kg, 0.01 microgram/kg, 0.05 microgram/kg, 0.1 microgram/kg, 0.5 microgram/kg, 1.0 microgram/kg, 10.0 microgram/kg, 50.0 microgram/kg, 100.0 microgram/kg, 500 microgram/kg, 1.0 mg/kg, 5.0 mg/kg, 10.0 mg/kg, 15.0 mg/kg, 20.0 mg/kg, 25.0 mg/kg, 30.0 mg/kg, 35.0 mg/kg, 40.0 mg/kg, 45.0 mg/kg, 50.0 mg/kg, 60.0 mg/kg, 70.0 mg/kg, 80.0 mg/kg, 90.0 mg/kg, 100.0 mg/kg, 150.0 mg/kg, 200.0 mg/kg, 250.0 mg/kg, 300.0 mg/kg, 350.0 mg/kg, 400.0 mg/kg, 450.0 mg/kg, to greater than about 500.0 mg/kg or any incremental value thereof. It is to be understood that all values and ranges between these values and ranges are meant to be encompassed by the present invention.

The compounds of the disclosure can be administered at a dosage in the range from about 0.2 milligram/kg/day to greater than about 100 mg/kg/day. For example, the dosage may be 0.2 mg/kg/day to 100 mg/kg/day, 0.2 mg/kg/day to 50 mg/kg/day, 0.2 mg/kg/day to 25 mg/kg/day, 0.2 mg/kg/day to 10 mg/kg/day, 0.2 mg/kg/day to 7.5 mg/kg/day, 0.2 mg/kg/day to 5 mg/kg/day, 0.25 mg/kg/day to 100 mg/kg/day, 0.25 mg/kg/day to 50 mg/kg/day, 0.25 mg/kg/day to 25 mg/kg/day, 0.25 mg/kg/day to 10 mg/kg/day, 0.25 mg/kg/day to 7.5 mg/kg/day, 0.25 mg/kg/day to 5 mg/kg/day, 0.5 mg/kg/day to 50 mg/kg/day, 0.5 mg/kg/day to 25 mg/kg/day, 0.5 mg/kg/day to 20 mg/kg/day, 0.5 mg/kg/day to 15 mg/kg/day, 0.5 mg/kg/day to 10 mg/kg/day, 0.5 mg/kg/day to 7.5 mg/kg/day, 0.5 mg/kg/day to 5 mg/kg/day, 0.75 mg/kg/day to 50 mg/kg/day, 0.75 mg/kg/day to 25 mg/kg/day, 0.75 mg/kg/day to 20 mg/kg/day, 0.75 mg/kg/day to 15 mg/kg/day, 0.75 mg/kg/day to 10 mg/kg/day, 0.75 mg/kg/day to 7.5 mg/kg/day, 0.75 mg/kg/day to 5 mg/kg/day, 1.0 mg/kg/day to 50 mg/kg/day, 1.0 mg/kg/day to 25 mg/kg/day, 1.0 mg/kg/day to 20 mg/kg/day, 1.0 mg/kg/day to 15 mg/kg/day, 1.0 mg/kg/day to 10 mg/kg/day, 1.0 mg/kg/day to 7.5 mg/kg/day, 1.0 mg/kg/day to 5 mg/kg/day, 2 mg/kg/day to 50 mg/kg/day, 2 mg/kg/day to 25 mg/kg/day, 2 mg/kg/day to 20 mg/kg/day, 2 mg/kg/day to 15 mg/kg/day, 2 mg/kg/day to 10 mg/kg/day, 2 mg/kg/day to 7.5 mg/kg/day, or 2 mg/kg/day to 5 mg/kg/day.

The compounds of the disclosure can be administered at a dosage in the range from about 0.25 milligram/kg/day to about 25 mg/kg/day. For example, the dosage may be 0.25 mg/kg/day, 0.5 mg/kg/day, 0.75 mg/kg/day, 1.0 mg/kg/day, 1.25 mg/kg/day, 1.5 mg/kg/day, 1.75 mg/kg/day, 2.0 mg/kg/day, 2.25 mg/kg/day, 2.5 mg/kg/day, 2.75 mg/kg/day, 3.0 mg/kg/day, 3.25 mg/kg/day, 3.5 mg/kg/day, 3.75 mg/kg/day, 4.0 mg/kg/day, 4.25 mg/kg/day, 4.5 mg/kg/day, 4.75 mg/kg/day, 5 mg/kg/day, 5.5 mg/kg/day, 6.0 mg/kg/day, 6.5 mg/kg/day, 7.0 mg/kg/day, 7.5 mg/kg/day, 8.0 mg/kg/day, 8.5 mg/kg/day, 9.0 mg/kg/day, 9.5 mg/kg/day, 10 mg/kg/day, 11 mg/kg/day, 12 mg/kg/day, 13 mg/kg/day, 14 mg/kg/day, 15 mg/kg/day, 16 mg/kg/day, 17 mg/kg/day, 18 mg/kg/day, 19 mg/kg/day, 20 mg/kg/day, 21 mg/kg/day, 22 mg/kg/day, 23 mg/kg/day, 24 mg/kg/day, 25 mg/kg/day, 26 mg/kg/day, 27 mg/kg/day, 28 mg/kg/day, 29 mg/kg/day, 30 mg/kg/day, 31 mg/kg/day, 32 mg/kg/day, 33 mg/kg/day, 34 mg/kg/day, 35 mg/kg/day, 36 mg/kg/day, 37 mg/kg/day, 38 mg/kg/day, 39 mg/kg/day, 40 mg/kg/day, 41 mg/kg/day, 42 mg/kg/day, 43 mg/kg/day, 44 mg/kg/day, 45 mg/kg/day, 46 mg/kg/day, 47 mg/kg/day, 48 mg/kg/day, 49 mg/kg/day, or 50 mg/kg/day.

In various embodiments, the compound or precursor thereof is administered in concentrations that range from 0.01 micromolar to greater than or equal to 500 micromolar. For example, the dose may be 0.01 micromolar, 0.02 micromolar, 0.05 micromolar, 0.1 micromolar, 0.15 micromolar, 0.2 micromolar, 0.5 micromolar, 0.7 micromolar, 1.0 micromolar, 3.0 micromolar, 5.0 micromolar, 7.0 micromolar, 10.0 micromolar, 15.0 micromolar, 20.0 micromolar, 25.0 micromolar, 30.0 micromolar, 35.0 micromolar, 40.0 micromolar, 45.0 micromolar, 50.0 micromolar, 60.0 micromolar, 70.0 micromolar, 80.0 micromolar, 90.0 micromolar, 100.0 micromolar, 150.0 micromolar, 200.0 micromolar, 250.0 micromolar, 300.0 micromolar, 350.0 micromolar, 400.0 micromolar, 450.0 micromolar, to greater than about 500.0 micromolar or any incremental value thereof. It is to be understood that all values and ranges between these values and ranges are meant to be encompassed by the present invention.

In various embodiments, the compound or precursor thereof is administered at concentrations that range from 0.10 microgram/mL to 500.0 microgram/mL. For example, the concentration may be 0.10 microgram/mL, 0.50 microgram/mL, 1 microgram/mL, 2.0 microgram/mL, 5.0 microgram/mL, 10.0 microgram/mL, 20 microgram/mL, 25 microgram/mL, 30 microgram/mL, 35 microgram/mL, 40 microgram/mL, 45 microgram/mL, 50 microgram/mL, 60.0 microgram/mL, 70.0 microgram/mL, 80.0 microgram/mL, 90.0 microgram/mL, 100.0 microgram/mL, 150.0 microgram/mL, 200.0 microgram/mL, 250.0 g/mL, 250.0 microgram/mL, 300.0 microgram/mL, 350.0 microgram/mL, 400.0 microgram/mL, 450.0 microgram/mL, to greater than about 500.0 microgram/mL or any incremental value thereof. It is to be understood that all values and ranges between these values and ranges are meant to be encompassed by the present invention.

The formulations of the disclosure can be administered in pharmaceutically acceptable solutions, which may routinely contain pharmaceutically acceptable concentrations of salt, buffering agents, preservatives, compatible carriers, adjuvants, and optionally other therapeutic ingredients.

For use in therapy, an effective amount of the compound can be administered to a subject by any mode that delivers the compound to the desired surface. Administering a pharmaceutical composition may be accomplished by any means known to the skilled artisan. Routes of administration include, but are not limited to, intravenous, intramuscular, intraperitoneal, intravesical (urinary bladder), oral, subcutaneous, direct injection (for example, into a tumor or abscess), mucosal (e.g., topical to eye), inhalation, and topical.

For intravenous and other parenteral routes of administration, a compound of the disclosure can be formulated as a lyophilized preparation, as a lyophilized preparation of liposome-intercalated or -encapsulated active compound, as a lipid complex in aqueous suspension, or as a salt complex. Lyophilized formulations are generally reconstituted in suitable aqueous solution, e.g., in sterile water or saline, shortly prior to administration.

For oral administration, the compounds can be formulated readily by combining the active compound(s) with pharmaceutically acceptable carriers well-known in the art. Such carriers enable the compounds of the disclosure to be formulated as tablets, pills, dragees, capsules, liquids, gels, syrups, slurries, suspensions and the like, for oral ingestion by a subject to be treated. Pharmaceutical preparations for oral use can be obtained as solid excipient, optionally grinding a resulting mixture, and processing the mixture of granules, after adding suitable auxiliaries, if desired, to obtain tablets or dragee cores. Suitable excipients are, in particular, fillers such as sugars, including lactose, sucrose, mannitol, or sorbitol; cellulose preparations such as, for example, maize starch, wheat starch, rice starch, potato starch, gelatin, gum tragacanth, methyl cellulose, hydroxypropylmethyl-cellulose, sodium carboxymethylcellulose, and/or polyvinylpyrrolidone (PVP). If desired, disintegrating agents may be added, such as the cross-linked polyvinyl pyrrolidone, agar, or alginic acid or a salt thereof such as sodium alginate. Optionally the oral formulations may also be formulated in saline or buffers, e.g., EDTA for neutralizing internal acid conditions or may be administered without any carriers.

Also contemplated are oral dosage forms of the compounds of the disclosure. The compounds of the disclosure may be chemically modified so that oral delivery of the derivative is efficacious. Generally, the chemical modification contemplated is the attachment of at least one moiety to the compound itself, where said moiety permits (a) inhibition of acid hydrolysis; and (b) uptake into the blood stream from the stomach or intestine. Also desired is the increase in overall stability of the compounds and increase in circulation time in the body. Examples of such moieties include: polyethylene glycol, copolymers of ethylene glycol and propylene glycol, carboxymethyl cellulose, dextran, polyvinyl alcohol, polyvinyl pyrrolidone and polyproline. Abuchowski and Davis, "Soluble Polymer-Enzyme Adducts", In: Enzymes as Drugs, Hocenberg and Roberts, eds., Wiley-Interscience, New York, N.Y., pp. 367-383 (1981); Newmark et al., *J Appl Biochem* 4:185-9 (1982). Other polymers that could be used are poly-1,3-dioxolane and poly-1,3,6- tioxocane. For pharmaceutical usage, as indicated above, polyethylene glycol moieties are suitable.

The location of release of a compound of the disclosure may be the stomach, the small intestine (the duodenum, the jejunum, or the ileum), or the large intestine. One skilled in the art has available formulations which will not dissolve in the stomach, yet will release the material in the duodenum or elsewhere in the intestine. The release can avoid the deleterious effects of the stomach environment, either by protection of the compound of the disclosure or by release of the compound beyond the stomach environment, such as in the intestine.

To ensure full gastric resistance a coating impermeable to at least pH 5.0 is essential. Examples of the more common inert ingredients that are used as enteric coatings are cellulose acetate trimellitate (CAT), hydroxypropylmethylcellulose phthalate (HPMCP), HPMCP 50, HPMCP 55, polyvinyl acetate phthalate (PVAP), Eudragit L30D, Aquateric, cellulose acetate phthalate (CAP), Eudragit L, Eudragit S, and shellac. These coatings may be used as mixed films.

A coating or mixture of coatings can also be used on tablets, which are not intended for protection against the stomach. This can include sugar coatings, or coatings which make the tablet easier to swallow. Capsules may consist of a hard shell (such as gelatin) for delivery of dry therapeutic (e.g., powder); for liquid forms, a soft gelatin shell may be used. The shell material of cachets could be thick starch or other edible paper. For pills, lozenges, molded tablets or tablet triturates, moist massing techniques can be used.

The therapeutic can be included in the formulation as fine multi-particulates in the form of granules or pellets of particle size about 1 mm. The formulation of the material for capsule administration could also be as a powder, lightly compressed plugs or even as tablets. The therapeutic could be prepared by compression.

Colorants and flavoring agents may all be included. For example, the compound of the disclosure may be formulated (such as by liposome or microsphere encapsulation) and then further contained within an edible product, such as a refrigerated beverage containing colorants and flavoring agents.

One may dilute or increase the volume of the therapeutic with an inert material. These diluents could include carbohydrates, especially mannitol, a-lactose, anhydrous lactose, cellulose, sucrose, modified dextrans and starch. Certain inorganic salts may be also be used as fillers including calcium triphosphate, magnesium carbonate and sodium chloride. Some commercially available diluents are Fast-Flo, Emdex, STA-Rx 1500, Emcompress and Avicell.

Disintegrants may be included in the formulation of the therapeutic into a solid dosage form. Materials used as disintegrates include, but are not limited to, starch, including the commercial disintegrant based on starch, Explotab. Sodium starch glycolate, Amberlite, sodium carboxymethylcellulose, ultramylopectin, sodium alginate, gelatin, orange peel, acid carboxymethyl cellulose, natural sponge and bentonite may all be used. Another form of the disintegrants are the insoluble cationic exchange resins. Powdered gums may be used as disintegrants and as binders and these can include powdered gums such as agar, Karaya or tragacanth. Alginic acid and its sodium salt are also useful as disintegrants.

Binders may be used to hold the therapeutic agent together to form a hard tablet and include materials from natural products such as acacia, tragacanth, starch and gelatin. Others include methyl cellulose (MC), ethyl cellulose (EC) and carboxymethyl cellulose (CMC). Polyvinyl pyrrolidone (PVP) and hydroxypropylmethyl cellulose (HPMC) could both be used in alcoholic solutions to granulate the therapeutic.

An anti-frictional agent may be included in the formulation of the therapeutic to prevent sticking during the formulation process. Lubricants may be used as a layer between the therapeutic and the die wall, and these can include, but are not limited to, stearic acid including its magnesium and calcium salts, polytetrafluoroethylene (PTFE), liquid paraffin, vegetable oils and waxes. Soluble lubricants may also be used, such as sodium lauryl sulfate, magnesium lauryl sulfate, polyethylene glycol of various molecular weights, Carbowax 4000 and 6000.

Glidants that might improve the flow properties of the drug during formulation and to aid rearrangement during compression might be added. The glidants may include starch, talc, pyrogenic silica and hydrated silicoaluminate.

To aid dissolution of the therapeutic into the aqueous environment a surfactant might be added as a wetting agent. Surfactants may include anionic detergents such as sodium lauryl sulfate, dioctyl sodium sulfosuccinate and dioctyl sodium sulfonate. Cationic detergents which can be used include benzalkonium chloride and benzethonium chloride.

Potential non-ionic detergents that could be included in the formulation as surfactants include lauromacrogol 400, polyoxyl 40 stearate, polyoxyethylene hydrogenated castor oil 10, 50 and 60, glycerol monostearate, polysorbate 40, 60, 65 and 80, sucrose fatty acid ester, methyl cellulose and carboxymethyl cellulose. These surfactants could be present in the formulation of the compound of the disclosure or derivative either alone or as a mixture in different ratios.

Pharmaceutical preparations which can be used orally include push-fit capsules made of gelatin, as well as soft, sealed capsules made of gelatin and a plasticizer, such as glycerol or sorbitol. The push-fit capsules can contain the active ingredients in admixture with filler such as lactose, binders such as starches, and/or lubricants such as talc or magnesium stearate and, optionally, stabilizers. In soft capsules, the active compounds may be dissolved or suspended in suitable liquids, such as fatty oils, liquid paraffin, or liquid polyethylene glycols. In addition, stabilizers may be added. Microspheres formulated for oral administration may also be used. Such microspheres have been well-defined in the art. All formulations for oral administration should be in dosages suitable for such administration.

For buccal administration, the compositions may take the form of tablets or lozenges formulated in conventional manner.

For topical administration, the compound may be formulated as solutions, gels, ointments, creams, suspensions, etc. as are well-known in the art. Systemic formulations include those designed for administration by injection, e.g., subcutaneous, intravenous, intramuscular, intrathecal or intraperitoneal injection, as well as those designed for transdermal, transmucosal oral or pulmonary administration.

For administration by inhalation, compounds for use according to the present disclosure may be conveniently delivered in the form of an aerosol spray presentation from pressurized packs or a nebulizer, with the use of a suitable propellant, e.g., dichlorodifluoromethane, trichlorofluoromethane, dichlorotetrafluoroethane, carbon dioxide or other suitable gas. In the case of a pressurized aerosol the dosage unit may be determined by providing a valve to deliver a metered amount. Capsules and cartridges of e.g., gelatin for use in an inhaler or insufflator may be formulated containing a powder mix of the compound and a suitable powder base such as lactose or starch.

The compounds, when it is desirable to deliver them systemically, may be formulated for parenteral administration by injection, e.g., by bolus injection or continuous infusion. Formulations for injection may be presented in unit dosage form, e.g., in ampoules or in multi-dose containers, with an added preservative. The compositions may take such forms as suspensions, solutions or emulsions in oily or aqueous vehicles, and may contain formulatory agents such as suspending, stabilizing and/or dispersing agents.

Pharmaceutical formulations for parenteral administration include aqueous solutions of the active compounds in water-soluble form. Additionally, suspensions of the active compounds may be prepared as appropriate oily injection suspensions. Suitable lipophilic solvents or vehicles include fatty oils such as sesame oil, or synthetic fatty acid esters, such as ethyl oleate or triglycerides, or liposomes. Aqueous injection suspensions may contain substances which increase the viscosity of the suspension, such as sodium carboxymethylcellulose, sorbitol, or dextran. Optionally, the suspension may also contain suitable stabilizers or agents which increase the solubility of the compounds to allow for the preparation of highly concentrated solutions.

Alternatively, the active compounds may be in powder form for constitution with a suitable vehicle, e.g., sterile pyrogen-free water, before use.

The compounds may also be formulated in rectal or vaginal compositions such as suppositories or retention enemas, e.g., containing conventional suppository bases such as cocoa butter or other glycerides.

In addition to the formulations described above, a compound may also be formulated as a depot preparation. Such long acting formulations may be formulated with suitable polymeric or hydrophobic materials (for example as an emulsion in an acceptable oil) or ion exchange resins, or as sparingly soluble derivatives, for example, as a sparingly soluble salt.

The pharmaceutical compositions also may comprise suitable solid or gel phase carriers or excipients. Examples of such carriers or excipients include, but are not limited to, calcium carbonate, calcium phosphate, various sugars, starches, cellulose derivatives, gelatin, and polymers, such as polyethylene glycols.

Suitable liquid or solid pharmaceutical preparation forms are, for example, aqueous or saline solutions for inhalation, microencapsulated, encochleated, coated onto microscopic gold particles, contained in liposomes, nebulized, aerosols, pellets for implantation into the skin, or dried onto a sharp object to be scratched into the skin. The pharmaceutical compositions also include granules, powders, tablets, coated tablets, (micro)capsules, suppositories, syrups, emulsions, suspensions, creams, drops or preparations with protracted release of active compounds, in whose preparation excipients and additives and/or auxiliaries such as disintegrants, binders, coating agents, swelling agents, lubricants, flavorings, sweeteners or solubilizers are customarily used as described above. The pharmaceutical compositions are suitable for use in a variety of drug delivery systems. For a brief review of methods for drug delivery, see Langer, R., *Science* 249:1527-33 (1990).

The compound of the disclosure and optionally other therapeutics may be administered per se (neat) or in the form of a pharmaceutically acceptable salt. When used in medicine the salts should be pharmaceutically acceptable, but non-pharmaceutically acceptable salts may conveniently be used to prepare pharmaceutically acceptable salts thereof. Such salts include, but are not limited to, those prepared from the following acids: hydrochloric, hydrobromic, sulphuric, nitric, phosphoric, maleic, acetic, salicylic, p-toluene sulphonic, tartaric, citric, methane sulphonic, formic, malonic, succinic, naphthalene-2-sulphonic, and benzene sulphonic. Also, such salts can be prepared as alkaline metal or alkaline earth salts, such as sodium, potassium or calcium salts of the carboxylic acid group.

Suitable buffering agents include: acetic acid and a salt (1-2% w/v); citric acid and a salt (1-3% w/v); boric acid and a salt (0.5-2.5% w/v); and phosphoric acid and a salt (0.8-2% w/v). Suitable preservatives include benzalkonium chloride (0.003-0.03% w/v); chlorobutanol (0.3-0.9% w/v); parabens (0.01-0.25% w/v) and thimerosal (0.004-0.02% w/v).

Pharmaceutical compositions of the disclosure contain an effective amount of a compound as described herein and optionally therapeutic agents included in a pharmaceutically acceptable carrier. The term "pharmaceutically acceptable carrier" means one or more compatible solid or liquid filler, diluents or encapsulating substances which are suitable for administration to a human or other vertebrate animal. The term "carrier" denotes an organic or inorganic ingredient, natural or synthetic, with which the active ingredient is combined to facilitate the application. The components of the pharmaceutical compositions also are capable of being commingled with the compounds of the present disclosure, and with each other, in a manner such that there is no interaction which would substantially impair the desired pharmaceutical efficiency.

The therapeutic agent(s), including specifically but not limited to a compound of the disclosure, may be provided in particles. Particles as used herein means nanoparticles or microparticles (or in some instances larger particles) which can consist in whole or in part of the compound of the disclosure or the other therapeutic agent(s) as described herein. The particles may contain the therapeutic agent(s) in a core surrounded by a coating, including, but not limited to, an enteric coating. The therapeutic agent(s) also may be dispersed throughout the particles. The therapeutic agent(s) also may be adsorbed into the particles. The particles may be of any order release kinetics, including zero-order release, first-order release, second-order release, delayed release, sustained release, immediate release, and any combination thereof, etc. The particle may include, in addition to the therapeutic agent(s), any of those materials routinely used in the art of pharmacy and medicine, including, but not limited to, erodible, nonerodible, biodegradable, or nonbiodegradable material or combinations thereof. The particles may be microcapsules which contain the compound of the disclosure in a solution or in a semi-solid state. The particles may be of virtually any shape.

Both non-biodegradable and biodegradable polymeric materials can be used in the manufacture of particles for delivering the therapeutic agent(s). Such polymers may be natural or synthetic polymers. The polymer is selected based on the period of time over which release is desired. Bioadhesive polymers of particular interest include bioerodible hydrogels described in Sawhney et al., *Macromolecules* 26:581-587 (1993), the teachings of which are incorporated herein. These include polyhyaluronic acids, casein, gelatin, glutin, polyanhydrides, polyacrylic acid, alginate, chitosan, poly(methyl methacrylates), poly(ethyl methacrylates), poly (butylmethacrylate), poly(isobutyl methacrylate), poly(hexylmethacrylate), poly(isodecyl methacrylate), poly(lauryl methacrylate), poly(phenyl methacrylate), poly(methyl acrylate), poly(isopropyl acrylate), poly(isobutyl acrylate), and poly(octadecyl acrylate).

The therapeutic agent(s) may be contained in controlled release systems. The term "controlled release" is intended to refer to any drug-containing formulation in which the manner and profile of drug release from the formulation are controlled. This refers to immediate as well as non-immediate release formulations, with non-immediate release formulations including, but not limited to, sustained release and delayed release formulations. The term "sustained release" (also referred to as "extended release") is used in its conventional sense to refer to a drug formulation that provides for gradual release of a drug over an extended period of time, and that can result in substantially constant blood levels of a drug over an extended time period. The term "delayed release" is used in its conventional sense to refer to a drug formulation in which there is a time delay between administration of the formulation and the release of the drug therefrom. "Delayed release" may or may not involve gradual release of drug over an extended period of time, and thus may or may not be "sustained release."

Use of a long-term sustained release implant may be particularly suitable for treatment of chronic conditions. "Long-term" release, as used herein, means that the implant is constructed and arranged to deliver therapeutic levels of the active ingredient for at least 7 days, and up to 30-60 days. Long-term sustained release implants are well-known to those of ordinary skill in the art and include some of the release systems described above.

Method of Designing a Compound that Selectively Inhibits Erythrocyte Band 3 Tyrosine Phosphorylation Over a Growth Factor Receptor Tyrosine Kinase The disclosure also relates to a method of designing a compound that selectively inhibits erythrocyte band 3 tyrosine phosphorylation over a growth factor receptor tyrosine kinase. The method comprises:
- identifying a lead compound that binds to Syk and to growth factor receptor tyrosine kinase;
- obtaining the crystal structure or computer docking model profile of the lead compound binding to Syk and of the lead compound binding to the growth factor receptor tyrosine kinase;
- identifying from the crystal structure or computer docking model profile at least one cavity that is present in the ATP-binding pocket of Syk but is not present in the ATP-binding pocket of the growth factor receptor tyrosine kinase and which can be occupied by the lead compound; and
- providing a second compound, which is bulkier than the lead compound and which can fill the cavity of the ATP-binding pocket of Syk and cannot fit into the ATP-binding pocket of the growth factor receptor tyrosine kinase.

It will be understood by one of ordinary skill in the relevant arts that other suitable modifications and adaptations to the compositions and methods described herein are readily apparent from the description of the disclosure contained herein in view of information known to the ordinarily skilled artisan, and may be made without departing from the scope of the disclosure or any embodiment thereof. Having now described the present disclosure in detail, the same will be more clearly understood by reference to the following examples, which are included herewith for purposes of illustration only and are not intended to be limiting of the disclosure.

EXAMPLES

The disclosure now being generally described, it will be more readily understood by reference to the following examples, which are included merely for purposes of illustration of various aspects and embodiments of the present disclosure and are not intended to limit the disclosure.

Cation effluxes are known to cause sickle cell shrinkage that in turn enhances sickle hemoglobin (HbS) polymerization, red blood cell (RBC) sickling and loss of erythrocyte deformability. Because the sickled shape is believed to augment entrapment of the cell within the microvasculature, and since the reduced deformability is thought to compromise the cell's rheology, the consequences of RBC dehydration are hypothesized to contribute prominently to the cellular changes associated with sickle cell disease (SCD). However curiously, prevention of sickle cell dehydration in the clinic has not been observed to prevent the symptoms of SCD, raising questions regarding its role in the pathology of the disease.

Activation of adhesion receptors on both RBCs and the vascular endothelium is also among the many conspicuous changes that accompany SCD. Since the activation of adhesion receptors is thought to retard flow of white cells and RBCs through the capillaries of an SCD patient, upregulation of these adhesion receptors is similarly believed to contribute to vaso-occlusive events. Indeed, blockade of some adhesion receptors may mitigate several symptoms of SCD in the clinic.

RBC membrane fragmentation and the consequent release of micro-particles (MPs), free HbS and other erythrocyte proteins (e.g., arginase) are also thought to induce intravascular thrombosis, vasoconstriction, and upregulation of adhesion receptors on the endothelium. Because each of these processes will contribute to retardation of blood flow, they have also been considered as potential causes of vaso-occlusion.

In order to explore this latter possible mechanism of vaso-occlusion, a hypothesis was developed to explain how oxidative stress known to arise in sickle cells can lead to erythrocyte membrane destabilization, the formation of microparticles (MPs) and release of free HbS and arginase. In this hypothesis, HbS denaturation, the formation of hemichromes and the release of heme iron causes an oxidative stress in sickle RBCs that leads to inhibition of RBC tyrosine phosphatases, resulting in a dramatic increase in the tyrosine phosphorylation of band 3. This rise in tyrosine phosphorylation of band 3 induces a major conformational change in Band 3 that promotes dissociation of the spectrin/actin cytoskeleton and the consequent membrane destabilization. Destabilization of the sickle RBC membrane then leads to the release of membrane-derived MPs, which promote the well-established micro-thromboses.

The concomitant release of HbS into the bloodstream with its subsequent activation of the endothelium to express adhesion receptors creates a sticky vascular wall that retards the flow of both red and white cells through the capillaries. The ability of free Hb to scavenge NO and thereby subvert its vasodilating activity can further exacerbate the retarded blood flow and micro-thromboses mentioned above. When activated in concert, these processes can eventually overcome antithrombotic pathways and promote vaso-occlusion.

Based on the aforementioned non-limiting hypothesis, tyrosine kinase inhibitor that would block Band 3 tyrosine phosphorylation and the associated vaso-occlusive events were designed.

S701 demonstrates an ability to inhibit tyrosine phosphorylation of band 3 in sickle cells with reduced inhibitory activity towards multiple growth factor receptors.

Figure 2A:
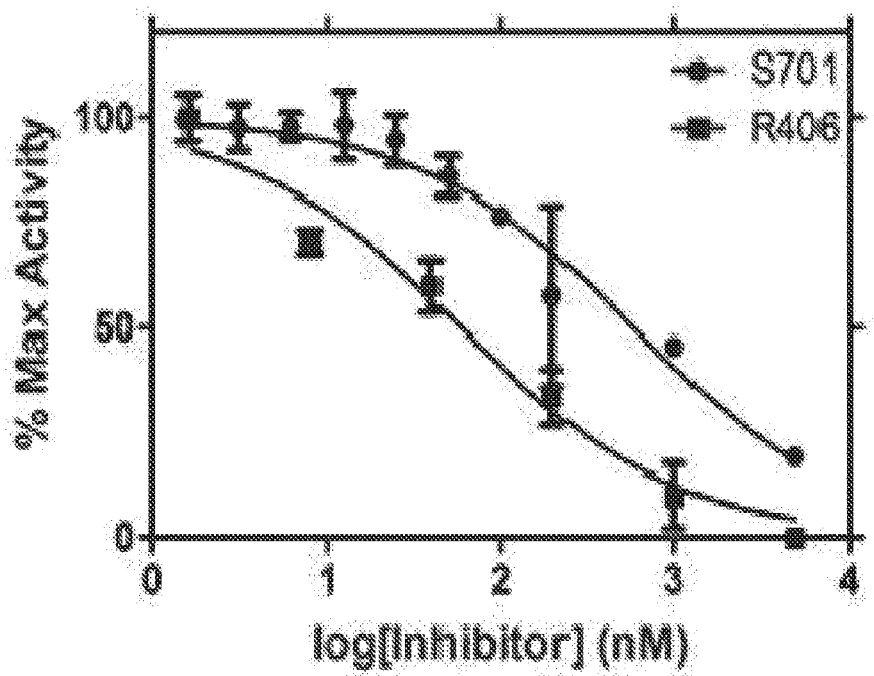
FIG. 2A is a graph of log[inhibitor] (nm) vs. % maximum (Max) activity showing the results of biochemical assay of R406 and S701 using the ADP-Glo kit ($IC_{50}$ values of 59 nM and 581 nM, respectively).
Figure 2B:
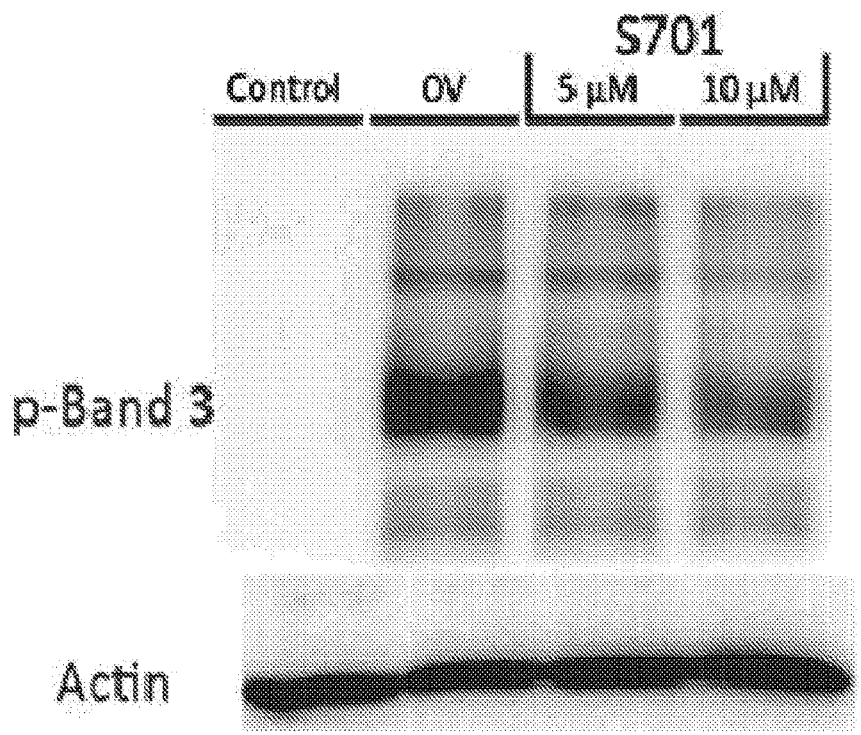
FIG. 2B is the Western blot of red blood cell (RBC) lysates after treatment with orthovanadate (OV) in the absence or presence of S701. A general anti-pY antibody was used to show phosphorylated Band 3. Actin was used as a loading control.
Figure 3A:
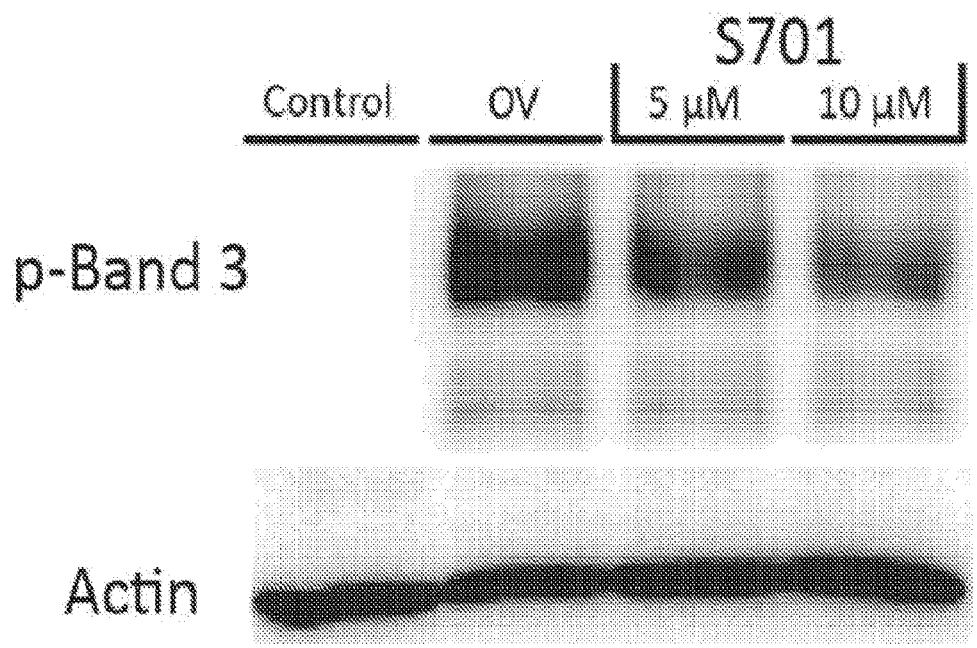
FIGS. 3A, 3B, and 3C are in vitro measurements of the efficacy of S701 against band 3 phosphorylation (FIG. 3A), Hb (FIG. 3B), and microparticle (MP) release from healthy human RBCs (FIG. 3C) stimulated with 2 mM phosphatase inhibitor OV in the presence or absence of 5 or 10 μM S701 as indicated.
Figure 3B:
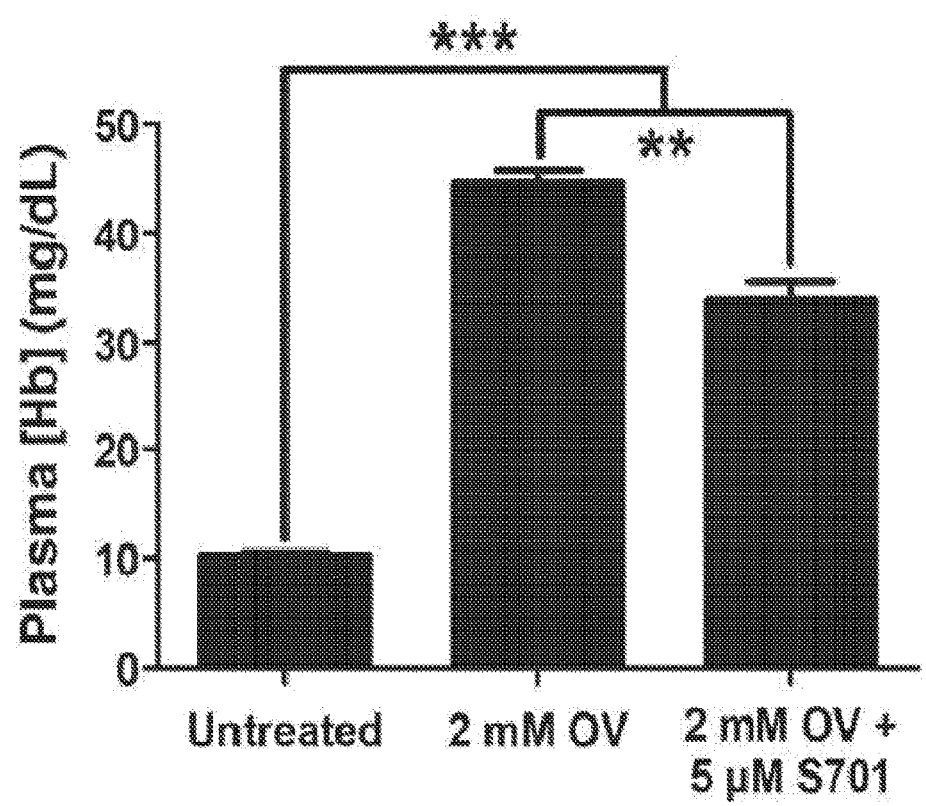
Figure 3C:
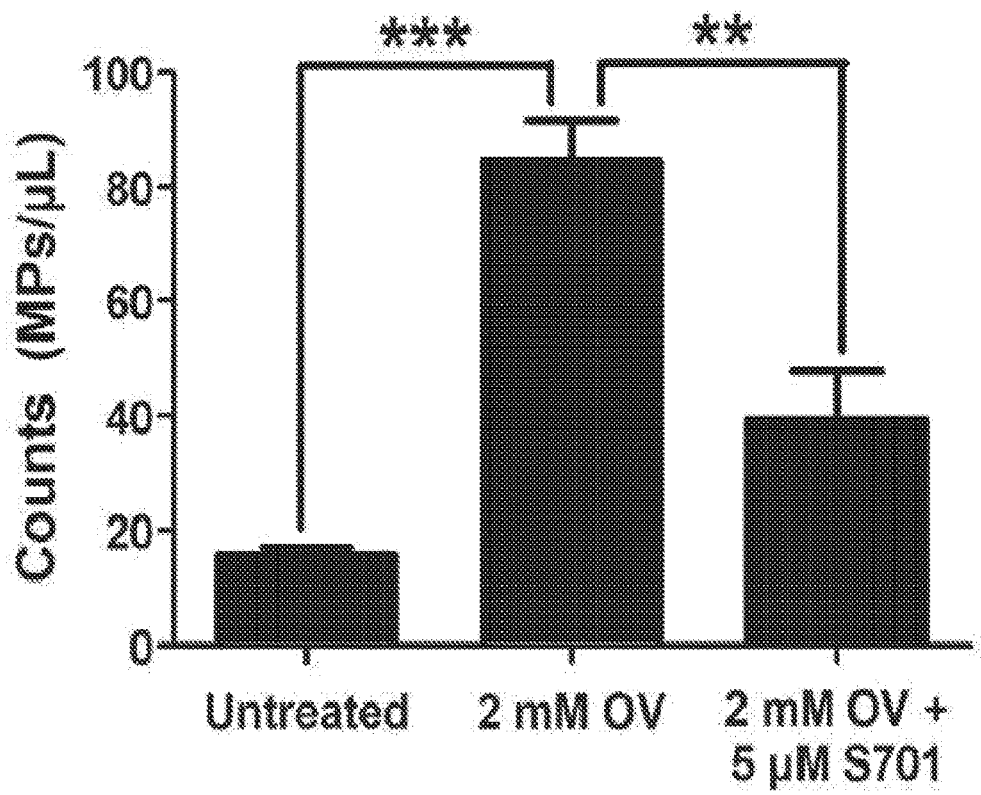

Specifically, sickle cells treated with S701 has reduced band 3 tyrosine phosphorylation (FIG. 2), reduced release of MPs from the same cells (FIG. 4), and the reduced concomitant discharge of free HbS from the treated cells (FIG. 3).

Figure 5A:
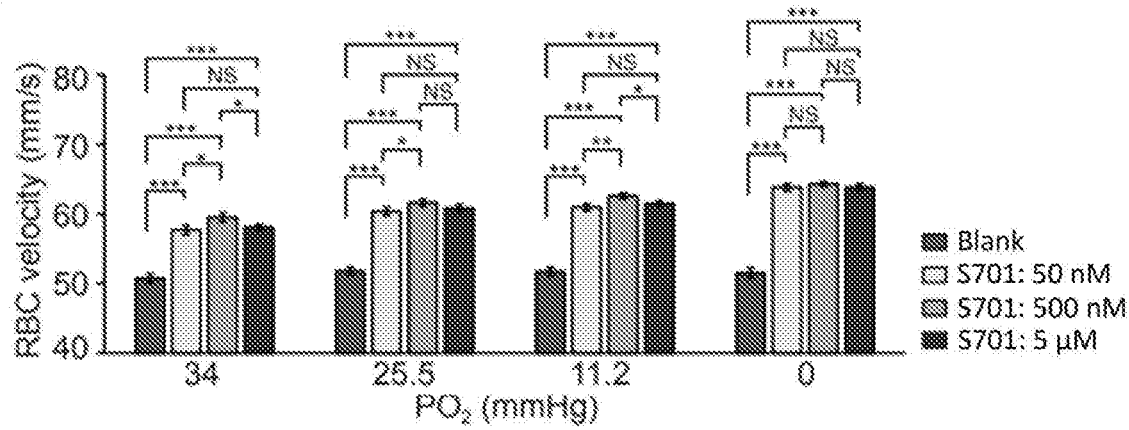
FIG. 5A is the human SCD RBC velocity measurements after passing through a capillary with a diameter of 5 μm to simulate blood vessel capillaries.
Figure 5B:
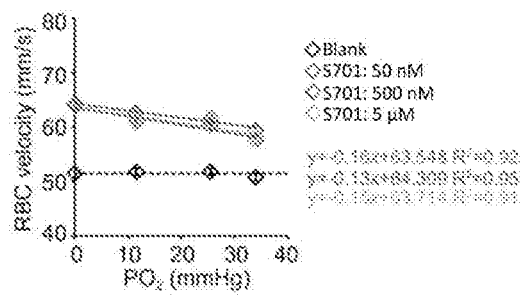
FIG. 5B is the data from FIG. 5A replotted to show the RBC velocity as conditions approach known deoxygenation conditions of the RBC.

S701 simultaneously improves the flow of sickle cells through glass capillaries and displays reduced inhibition on most growth factor receptor tyrosine kinases (FIG. 5). It is likely that S701 and its derivatives with similar structures serve as excellent candidates for treatment of SCD, even among child patients.

A. Materials

Except where indicated below, all reagents were obtained from Sigma.

B. Processing of Sickle Cell Blood Samples

Venous blood from sickle cell disease patient(s) and healthy donor(s) (travel control) was collected at Cincinnati Children's Hospital using BD vacutainer tubes containing buffered sodium citrate or EDTA anticoagulant. All blood donations were provided with informed consent and approved by the Cincinnati Children's Hospital IRB. Collected blood was immediately placed on ice or cold pack to maintain the blood at 4° C. and shipped within 1-3 days by overnight express. Blood was centrifuged at 800 rcf for 10 minutes at room temperature and plasma was removed for subsequent MP and cell-free Hb analysis. The packed RBC pellet was then washed 3× with phosphate-buffered saline, pH 7.4, containing 5 mM glucose (PBS-G), discarding the buffy coat after each wash cycle.

C. Measurement of Red Blood Cell Deformability

Erythrocyte deformability was measured using a Technicon™ Ektacytometer and plotted as elongation index versus shear stress, as described elsewhere. Data were acquired while accelerating the ektacytometer from 0 rpm to 250 rpm and shear stress was calculated using the equation:

Shears stress=(2π×viscoscity (poise)×rpm×radius of cylinder (cm))/((60×gap between the two cylinders (cm))

D. Quantitation of Band 3 Tyrosine Phosphorylation

Washed RBCs were suspended at 30% hematocrit (Hct.) in PBS-G and treated with either 5 µM drug (imatinib, PRT062607 or R406) or vehicle (control) for 4 hours at 37° C. under 50 rpm shaking. RBC ghosts were then prepared by mixing 150 µL of packed RBCs with 1500 µL of ice-cold ghost buffer (5 mM $Na_2HPO_4$, 1 mM EDTA, pH 8.0, containing 1 mM phenylmethylsulfonyl fluoride (PMSF) and 1% phosphatase cocktail inhibitors 2 and 3) and allowed to sit on ice for 30 min. Samples were centrifuged at 13000 rpm for 15 min at 4° C. and supernatants were removed. Ghost pellets were washed an additional 3×, after which 10 µL was removed for determination of protein concentration using Pierce™ Rapid Gold BCA Protein Assay (Thermo Fisher Scientific, A53226). Residual ghosts were solubilized in 4× Laemmli buffer (Bio-Rad) at a concentration of 1 µg protein/L buffer and warmed to 30° C. for 30 min prior to storage at −20° C. until use.

Band 3 tyrosine phosphorylation was quantitated by loading 30 µL of each thawed sample onto a 10% SDS-PAGE gel and separating at 90, 120 and 150 V for 30, 45 and 20 minutes, respectively. Proteins were then transferred to a nitrocellulose membrane at 100 V for 2 hours, after which membranes were immunostained with anti-phosphotyrosine (1:1000, Cell Signaling, Inc.) or anti-actin (1:20000) antibodies dissolved in TBST (25 mM Tris, 140 mM NaCl, 3 mM KCl, 0.05% v/v Tween-20) containing 5% w/v milk. After washing, membranes were incubated in TBST containing anti-mouse-horseradish peroxidase or anti-rabbit-horseradish peroxidase antibody conjugates, then washed 4× in TBST, and incubated with SuperSignal™ West Pico chemiluminescent substrate (Thermo Scientific™) prior to imaging with a Chemidoc XRS+ (BioRad). Band 3 tyrosine phosphorylation intensity/densitometry was quantitated using image J software.

E. Analysis of Erythrocyte-Derived Microparticles and Free Plasma Hemoglobin

Plasma from sickle cell samples (see above) was centrifuged 2× at 2500 rcf for 15 minutes to remove platelets and 100 µL of supernatant containing MPs was incubated for 20 minutes on ice with 0.5 µL of BV421 mouse-anti-human 235a antibody (anti-glycophorin A; BD Biosciences #562938). Samples were diluted with 1000 µL of stain buffer (BD Biosciences #554656), transferred to BD Trucount™ tubes (BD Biosciences #340334) and analyzed on an Attune NxT Flow Cytometer by utilizing violet fluorescent trigger channel. The absolute number of RBC-derived microparticles was then calculated using the following formula, $$\text{Absolute microparticles count} = \left(\frac{\text{Glycophorin A positive events}}{\text{bead events}}\right) \times \left(\frac{\text{Number of trucount beads}}{\text{Volume}}\right)$$

For evaluation of the effect of tyrosine kinase inhibitors on release of RBC-derived MPs from sickle cells suspended at 30% Hct in PBS-G, 500 µL washed RBCs were treated for 1 hour with the desired concentration of tyrosine kinase inhibitor or vehicle control, and then shaken at 1400 RPM for 4 h. Newly released microparticles were then separated from residual RBCs by centrifuging at 800 rcf for 10 minutes, collecting the supernatant, and analyzing the supernatant for RBC-derived MPs as described above.

Cayman's hemoglobin colorimetric assay was used to quantitate the level of cell-free plasma hemoglobin in both patient plasma samples and in the above kinase-treated RBC supernatant samples according to the manufacturer's instruction.

F. Measurement of Exit Velocity of RBC

Microfluidic capillary devices were fabricated with polydimethylsiloxane (PDMS) using standard soft photolithography techniques. Capillaries were constructed with a straight channel (w=75 µm, h=6.52 µm) containing a constriction (wc=5 µm and h=6.52 µm). To control the oxygen level inside the channel, the microfluidic device was submerged in a customized glass chamber filled with sodium sulfite solution (0M, 0.01M, 0.1M or 1M) (Sigma-Aldrich). The oxygen level was calibrated using 25 µM of tris(2,2'-bipyridyl)dichlororuthenium(II) hexahydrate (an $O_2$ indicator, Sigma-Aldrich) then converted into a $PO_2$ value using the Stern-Volmer equation, $I0/I=1+PO2 \times Kq$, where $I^0$ is the maximum fluorescence intensity and Kq is the quenching constant. The calibration results are obtained.

Sickle cell blood samples were obtained from five patients (n=5, age 4-9 years old) and RBCs were isolated by centrifugation. After washing 3× at 500 rcf for 1.5 min using PBS (ThermoFisher, Catalog #: 20012027, pH 7.2) containing 5 mM glucose, packed RBCs were diluted to 1% v/v for microfluidic measurements. For quantitation of RBC velocity in the presence or absence of tyrosine kinase inhibitors, 10 µL of 100× imatinib dissolved in DMSO were added to 30 μL packed RBCs in the present of 960 μL PBS-G. RBC suspension was then incubated for 4 hours at 37° C. and used directly for microfluidic measurements. For quantitation of RBC velocity in a microfluidic capillary, the RBC suspension was injected into the capillary at a constant pressure of 1.6 psi, and the velocity of the RBCs in the constriction was recorded using a high-speed video camera (Phantom Miro M120, 1900 frames per second) mounted on an inverted microscope (Leica DMI 6000B). Data were analyzed using Phantom Camera Control software.

G. In Vitro Analysis of Syk Inhibitors ADP-Glo Assay

Syk kinase inhibition assays were run on 96-well plates using the ADP-Glo assay kit according to manufacturer's specifications. All kinase reactions were run using Kinase Assay Buffer III supplemented with DTT and $MnCl_2$ as required by the kinase of interest to generate kinase reaction buffer. Stock solutions of kinase inhibitor in DMSO were diluted into 2× kinase reaction buffer and the final concentration of DMSO in each kinase reaction was held below 1%. The total volume of each kinase reaction was 25 μL apportioned as: 5 μL 2× kinase reaction buffer or diluted kinase inhibitor, 5 μL 1 mg/mL (stock) kinase substrate, 10 μL kinase in kinase reaction buffer, and 5 μL 250 μM ATP diluted into kinase reaction buffer. Kinase inhibitors were incubated with kinase and substrate prior to addition of ATP for 20 min at room temperature (RT). After addition of ATP to the wells, the plate was incubated at 37° C. for 30-60 minutes depending on the kinase used. After incubation the plate was cooled to RT for 5 minutes prior to addition of 25 μL ADP-Glo reagent and incubation on a shaker for 40 minutes. After 40 minutes, 50 μL Kinase Detection reagent were added and the plate was protected from light while incubated on a shaker. After 30 min, the luminescence was recorded using a Neo2 plate reader and 1 sec integration of the signal. The background signal was subtracted from all readings and the signal was normalized to the maximum signal obtained in the absence of inhibitor. Data were plotted and inhibition curves fit using Graphpad software.

Example 1. Design of S701

In an effort to design a Syk kinase inhibitor with reduced activity towards growth factor receptor tyrosine kinases, the geometries of the ATP binding sites of Syk and several growth factor receptors were compared, and it was noted than an unoccupied cavity exists in the binding site of Syk that is absent in the growth factor receptors. A tyrosine kinase inhibitor that would fill that cavity would fit poorly in the growth factor receptor kinase domains.

Figure 1B:
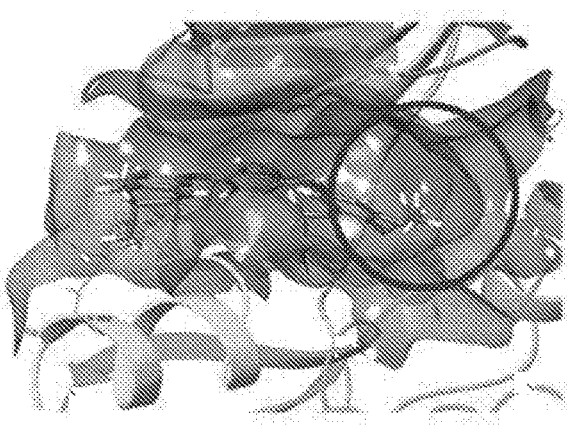
FIG. 1B is the computer simulated docking of the known Syk inhibitor R406 bound into the ATP-binding pocket of Syk.
Figure 1C:
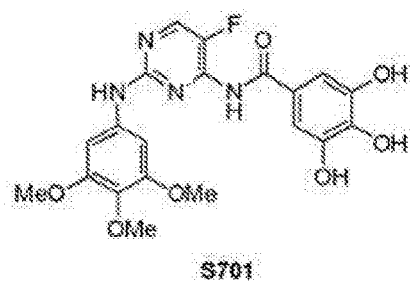
FIG. 1C is the structure of redesigned Syk inhibitor S701.
Figure 1D:
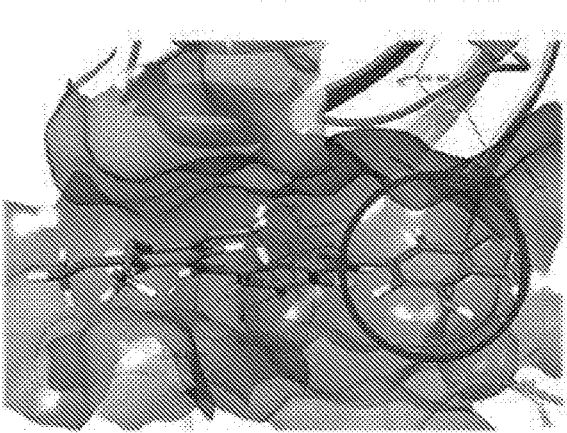
FIG. 1D is the computer simulated docking of redesigned Syk inhibitor S701 into the ATP-binding pocket of Syk. The PDB code of the crystal structure of Syk used for docking was 4YJT. The co-crystallized inhibitor GTC000233 present in 4YJT was removed after identifying the binding pocket and prior to computer simulated docking experiments with R406 and S701. The view is looking directly at the deepest pocket of the ATP-binding site. Dashed lines indicate favorable hydrogen bonds.

The only FDA approved Syk inhibitor, fostamatinib, R406, exhibits significant off-target inhibitory activity against multiple growth factor receptors, including VEGFR2, VEGFR3, as well as both PDGFR α and β, at concentrations below their measured $IC_{50}$s for Syk. As illustrated in FIGS. 1B and 1D, Syk has open space in its ATP-binding pocket that should allow binding of molecules that are too large to bind other tyrosine kinases.

As seen in FIG. 1B, R406 fits well into the ATP binding pocket but does not occupy an empty space, indicated by the blue circle. In contrast, the same pocket is nicely filled with a trihydroxyphenyl moiety that should render it too large to fit into most growth factor receptor binding sites.

In following computer simulated docking scores, S701 displays an improved docking score compared to R406 (−8.178 vs. −5.839) and was also selected based on its synthetic ease and ideal PK properties as calculated by QikProp. The calculated value for the octanol/water partition coefficient (QPlogPo/w) is 1.6, the predicted aqueous solubility (QPlogS) as −4.1, the predicted binding to human serum albumin (QPlogKhsa) as −0.3, and the percent human oral absorption as 60.

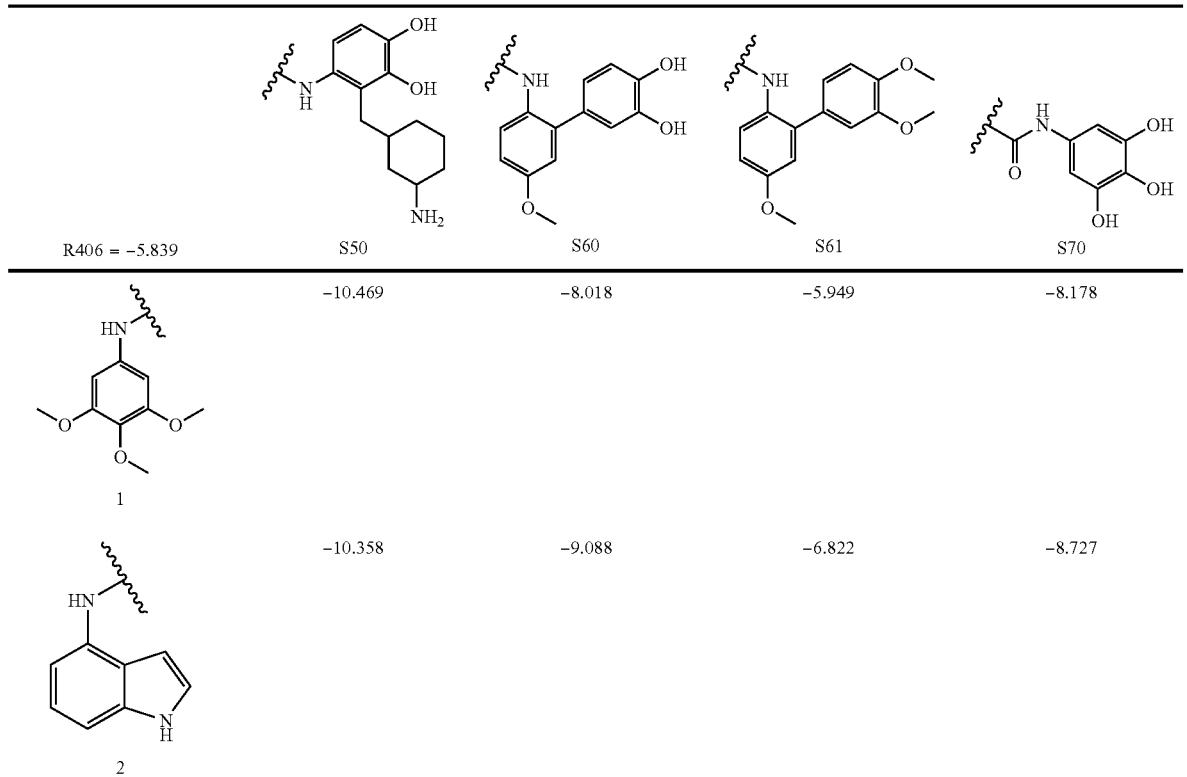

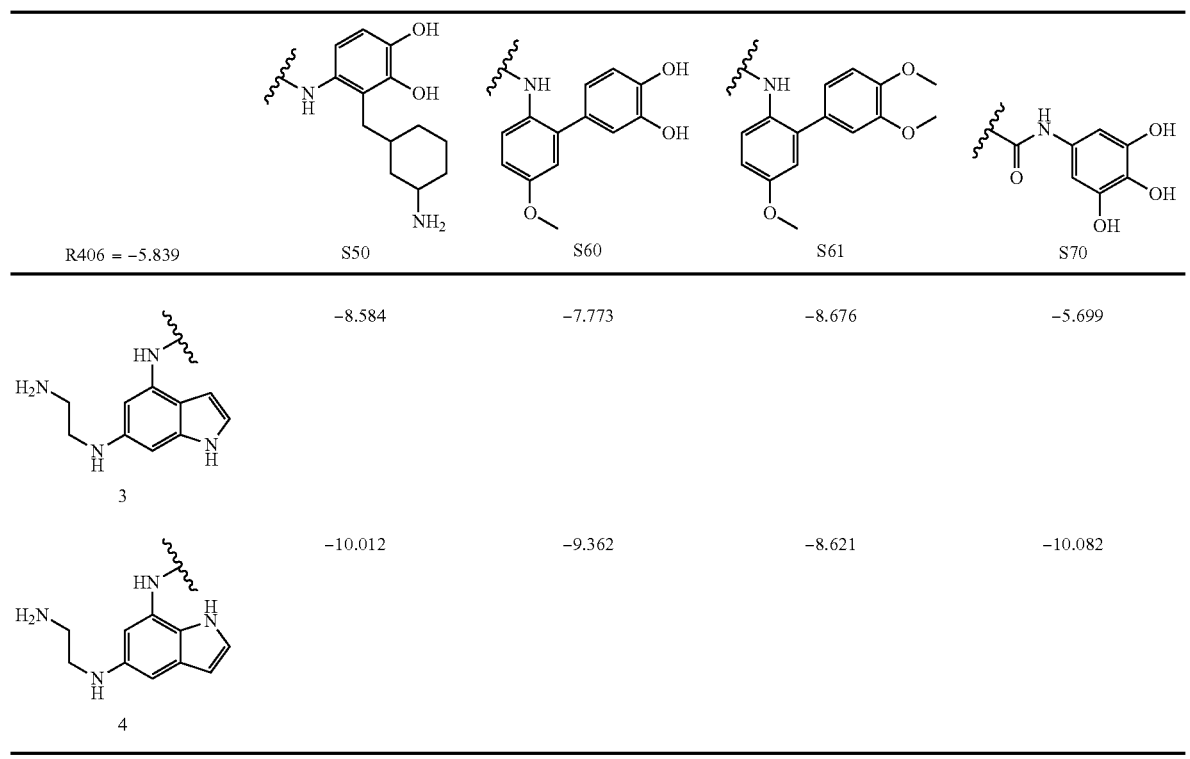
| | S50 | S60 | S61 | S70 |
|---|---|---|---|---|
| R406 = −5.839 | | | | |
| 3 | −8.584 | −7.773 | −8.676 | −5.699 |
| 4 | −10.012 | −9.362 | −8.621 | −10.082 |
Example 2. Synthesis of S701
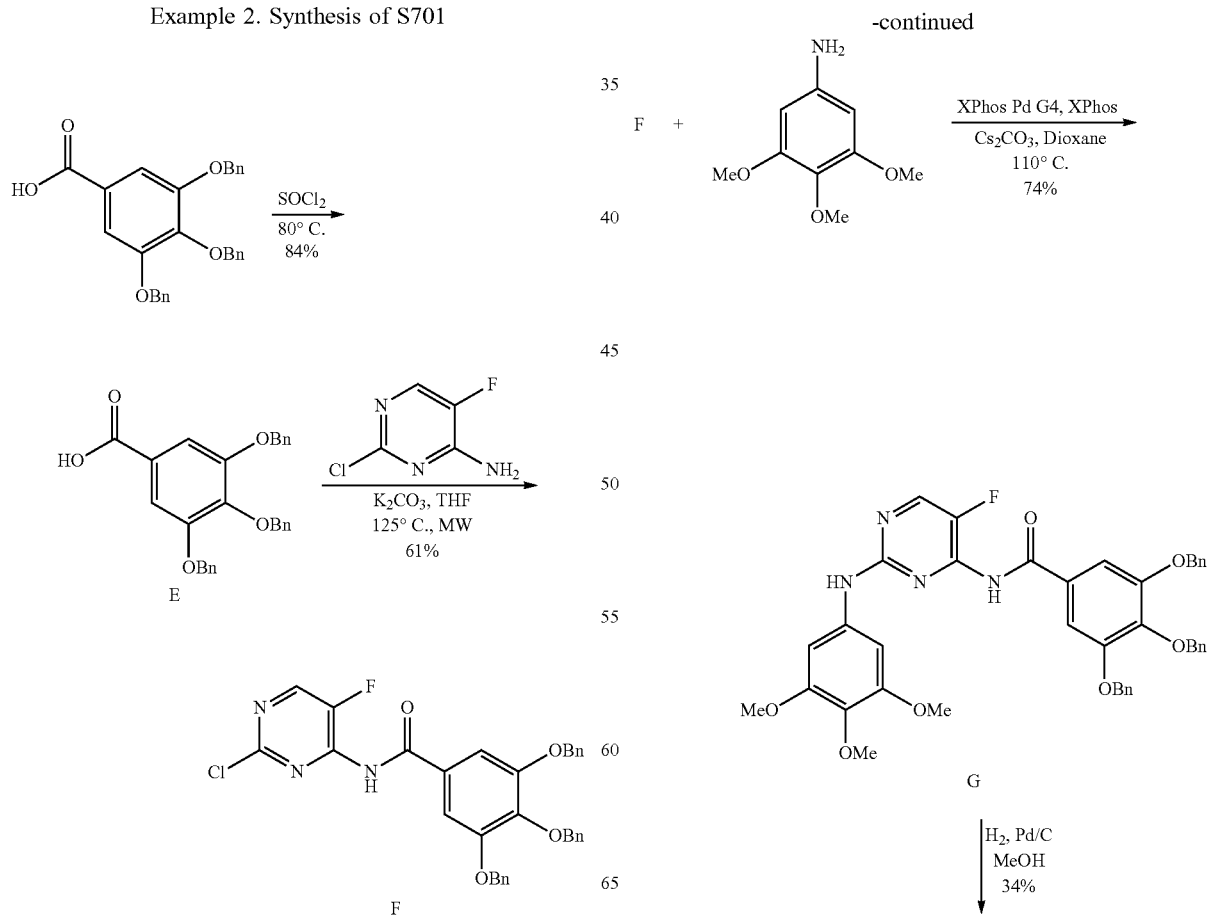

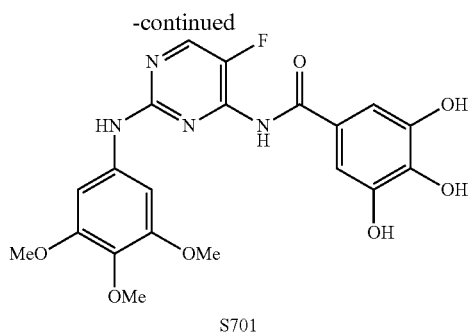

S701

3,4,5-tris(benzyloxy)benzoyl chloride (E)

3,4,5-tris(benzyloxy)benzoic acid (1 g, 2.27 mmol) was dissolved in thionyl chloride (10 mL) and heated to reflux. After 16 h, thionyl chloride was removed in vacuo and the resulting solid was recrystallized in cyclohexane to yield a white solid (873 mg, 84%). $^1$H NMR (500 MHz, CDCl$_3$): δ 7.35-7.16 (m, 15H), 5.09 (s, 2H), 5.05 (s, 4H) ppm; $^{13}$C NMR (125 MHz, CDCl$_3$): δ 167.72, 152.75, 144.86, 137.25, 136.32, 128.86, 128.68, 128.48, 128.47, 128.36, 127.96, 127.80, 111.25, 75.45, 71.61 ppm; LC-MS m/z: 458.2 [M]$^+$.

3,4,5-tris(benzyloxy)-N-(2-chloro-5-fluoropyrimidin-4-yl)benzamide (F)

E (93 mg, 0.203 mmol) and 4-amino-2-chloro-5-fluoropyrimidine (25 mg, 0.169 mmol) were dissolved in THF (2 mL) in a microwave reaction vial. K$_2$CO$_3$ was added and the reaction vessel was sealed with a septum cap. The reaction mixture was heated in a microwave reactor for 1 h at 140° C. After cooling to room temperature, the mixture was filtered and rinsed with DCM (3×10 mL). The combined rinses were concentrated to dry and the product was isolated by normal phase silica gel chromatography (Hexanes:EtOAc) to give a white solid (59 mg, 61%). $^1$H NMR (500 MHz, CDCl$_3$): δ 8.43 (s, 1H), 8.41 (d, J=2.1 Hz, 1H), 7.40-7.25 (m, 15H), 7.20 (s, 2H), 5.16 (s, 2H), 5.10 (s, 4H) ppm; $^{13}$C NMR (125 MHz, CDCl$_3$): δ 164.27, 154.43, 153.08, 149.01, 148.83, 148.74, 147.58, 147.40, 146.89, 142.73, 137.26, 136.39, 128.78, 128.40, 128.36, 128.28, 127.68, 127.40, 107.84, 75.37, 71.53 ppm; LC-MS m/z: 570.1 [M+H]$^+$.

3,4,5-tris(benzyloxy)-N-(5-fluoro-2-((3,4,5-trimethoxyphenyl)amino)pyrimidin-4-yl)benzamide (G)

F (146 mg, 0.26 mmol), 3,4,5-trimethoxyaniline (56 mg, 0.31 mmol), XPhos Pd G4 (22 mg, 0.026 mmol), XPhos (12 mg, 0.026 mmol), and Cs$_2$CO$_3$ (167 mg, 0.51 mmol) were placed into a vial with an open cap sealed by a PTFE liner. The reaction vial was purged with a gentle stream of N$_2$ for 10 min. and then anhydrous, ZerO$_2$® 1,4-Dioxane (500 μL) was added and the mixture was stirred at 110° C. under N$_2$ atmosphere for 16 h. After cooling to room temperature, the reaction mixture was filtered and the desired product was isolated by normal phase silica gel chromatography (Hexanes:EtOAc) to yield an orange solid (137 mg, 74%). $^1$H NMR (500 MHz, CDCl$_3$): δ 8.55 (s, 1H), 8.17 (d, J=2.3 Hz, 1H), 7.53 (s, 1H), 7.42-7.27 (m, 15H), 7.20 (s, 2H), 6.90 (s, 2H), 5.14 (s, 2H), 5.09 (s, 4H), 3.83 (s, 6H), 3.82 (s, 3H) ppm; $^{13}$C NMR (125 MHz, CDCl$_3$): δ 164.38, 155.82, 153.38, 152.87, 147.21, 147.12, 145.14, 144.97, 143.57, 142.41, 141.57, 137.31, 136.42, 135.55, 133.61, 128.64, 128.54, 128.44, 128.28, 128.18, 128.10, 127.83, 127.56, 107.60, 96.92, 75.24, 71.35, 60.99, 56.20 ppm; LC-MS m/z: 717.3 [M+H]$^+$.

N-(5-fluoro-2-((3,4,5-trimethoxyphenyl)amino)pyrimidin-4-yl)-3,4,5-trihydroxybenzamide (S701)

G (137 mg, 0.19 mmol) was dissolved in 1:1 methanol/DCM (5 mL), and 10% Pd/C added (14 mg) was added. The reaction vessel was purged with H$_2$ for 10 min, then sealed and the reaction proceeded under H$_2$ atmosphere. After 16 h, the Pd/C was filtered over Celite and rinsed with methanol (3×5 mL) and DCM (3×5 mL). The combined rinses were dried in vacuo, and the desired product was isolated on HPLC to yield an off white solid (29 mg, 34%). $^1$H NMR (500 MHz, DMSO-d$_6$): δ 9.44 (s, 1H), 8.46 (d, J=2.8 Hz, 1H), 7.18 (s, 2H), 6.99 (s, 2H), 3.76 (s, 6H), 3.60 (s, 3H) ppm; $^{13}$C NMR (125 MHz, DMSO-d$_6$): δ 165.40, 155.84, 152.67, 147.55, 147.47, 145.97, 145.80, 145.56, 144.98, 142.98, 138.00, 136.62, 132.24, 123.01, 107.96, 96.63, 60.12, 55.82 ppm; Q-TOF HRMS: m/z calculated for C$_{20}$H$_{19}$FN$_4$O$_7$ [M+H]$^+$ 447.1310; found 447.1309.

Example 3. Biochemical Properties of S701

Figure 7A:
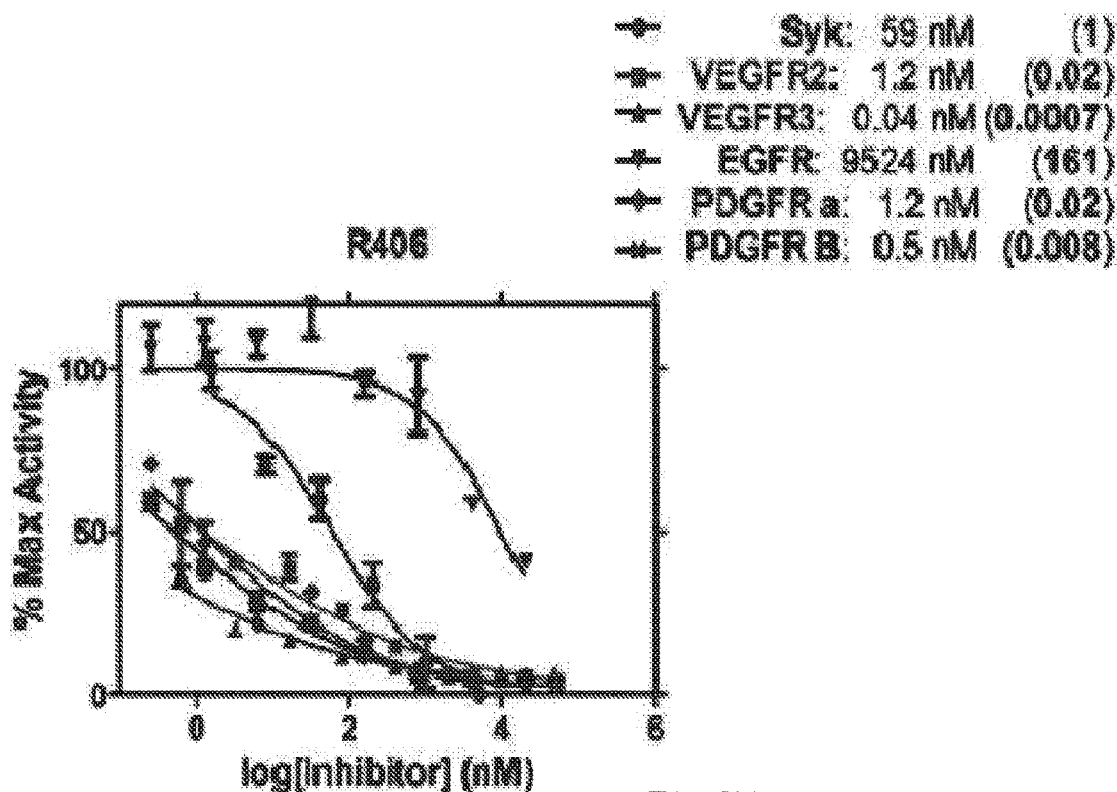
FIGS. 7A-7C are the comparison data of maximum activity for Syk versus growth factors vascular endothelial growth factor receptor (VEGFR) 2, VEGFR3, EGFR, platelet-derived growth factor receptor (PDGFR) A and PDGFR B in the presence of Syk inhibitor R406 (FIG. 7A), newly synthesized S701 (FIG. 7B), and Imatinib (FIG. 7C). The maximum activity of each kinase is shown relative to Syk activity by normalizing Syk affinity to each compound to 1 (measured by $IC_{50}$ value).
Figure 7B:
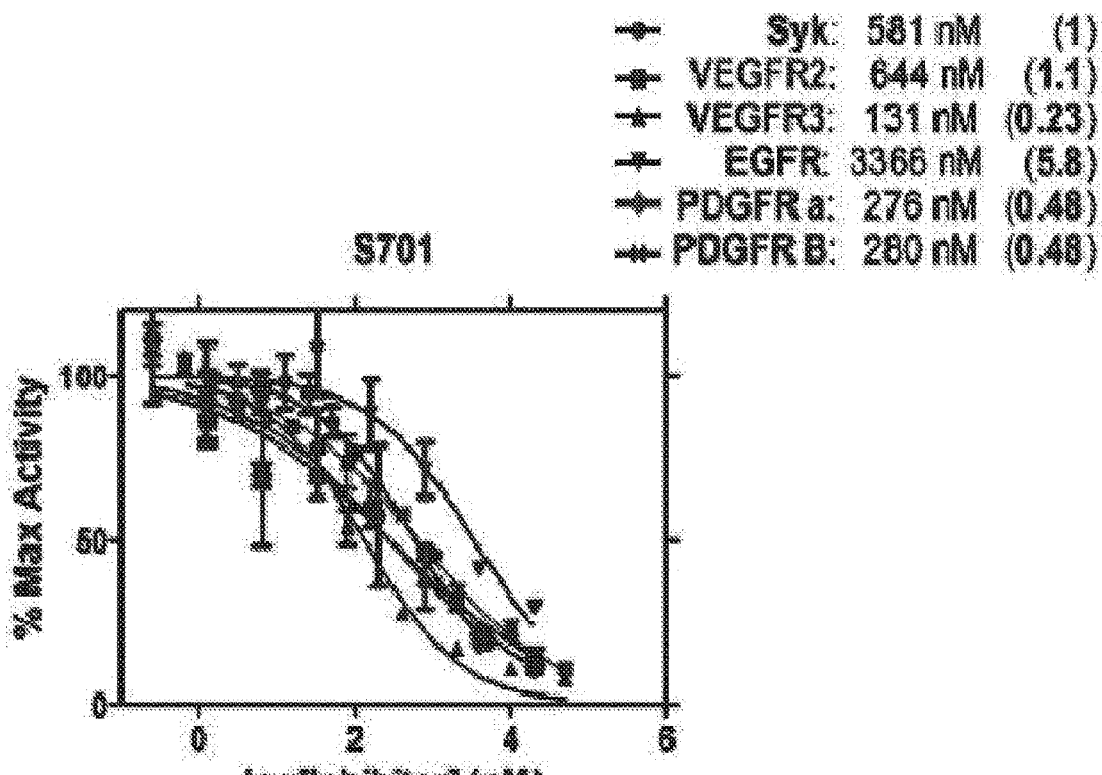

Using the commercially available ADP-Glo assay the IC$_{50}$ of S701 was measured as 581 nM for Syk (FIG. 7B), while R406 was measured in the same assay to be 59 nM (FIG. 7A), close to the reported value of 41 nM. S701's inhibition activity against a number of growth factors are also measured. As shown in FIG. 7A, R406 has significant growth inhibition effect on at least VEGF2, VEGF3, PDGF a and PDGF B, due to its ultralow IC$_{50}$ number against these growth factors. On the other hand, S701 has to be in really high concentrations to have any inhibitory effect on EGFR, a major growth factor important for child growth.

Figure 7C:
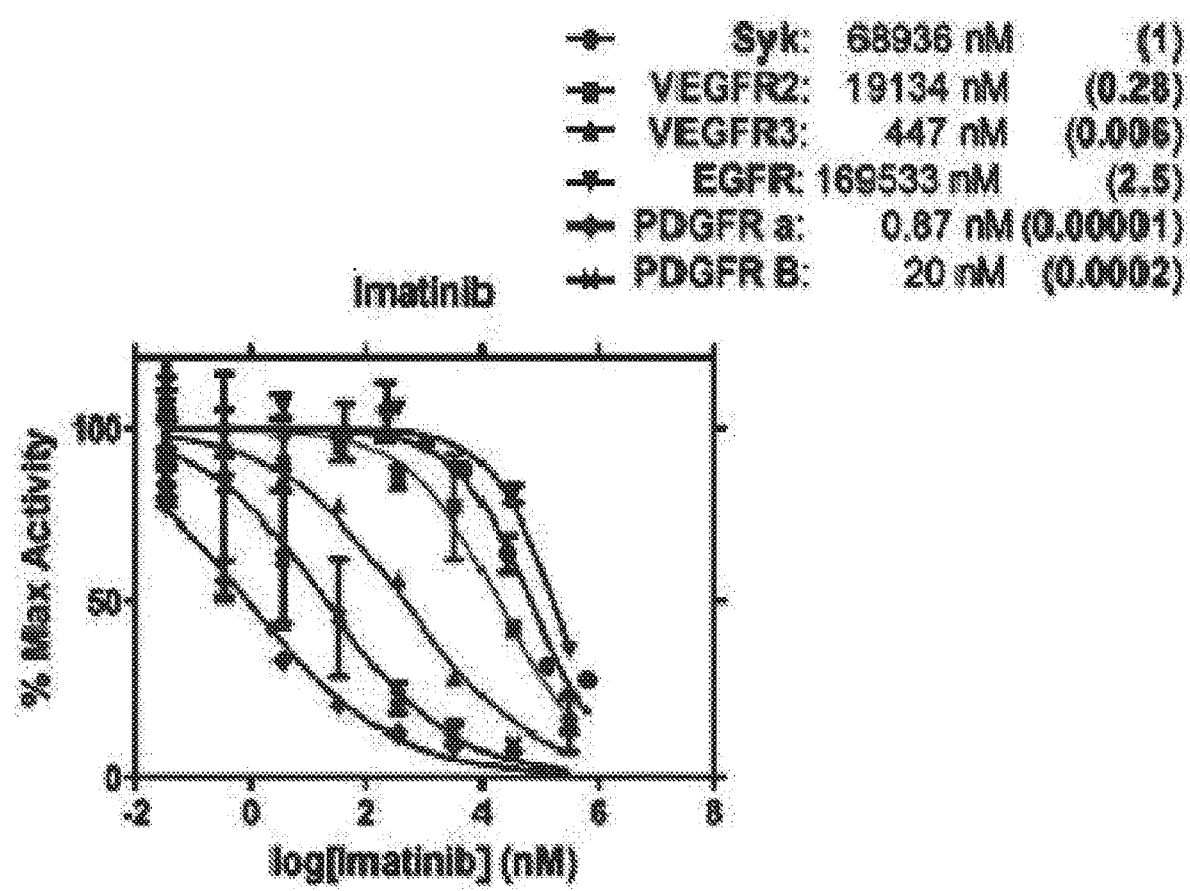
Figure 8A:
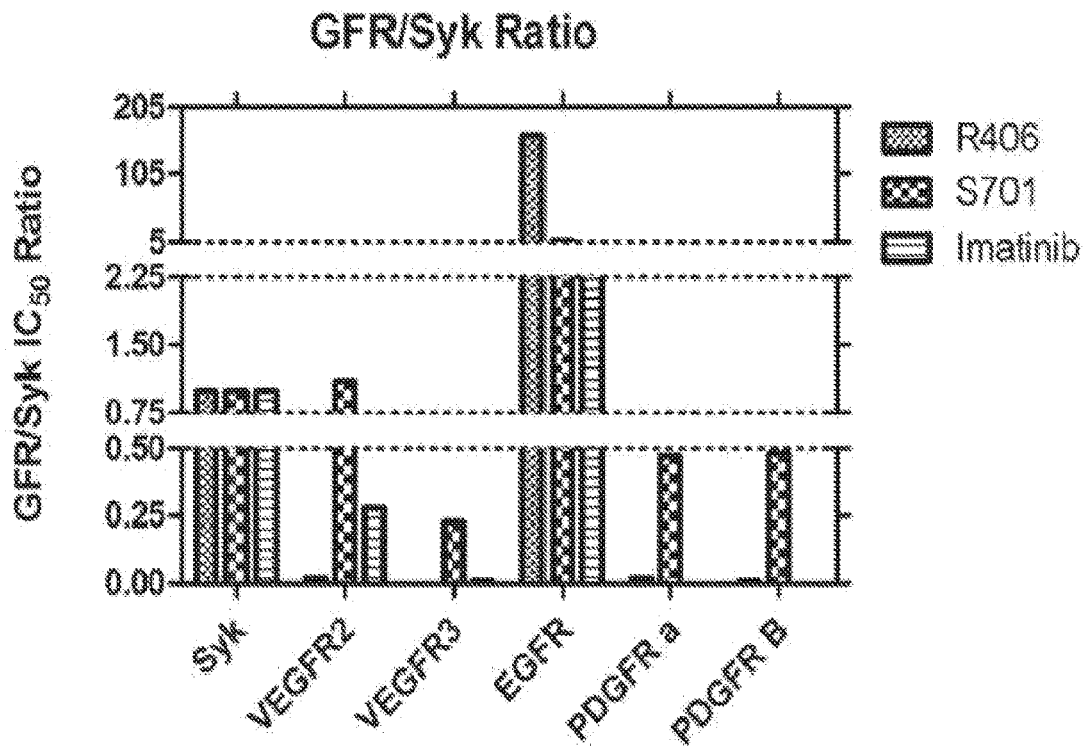
FIG. 8A shows the Affinity Ratios of various growth factor receptors (GFR) versus Syk to compounds R406, newly synthesized S701 and Imatinib.
Figure 8B:
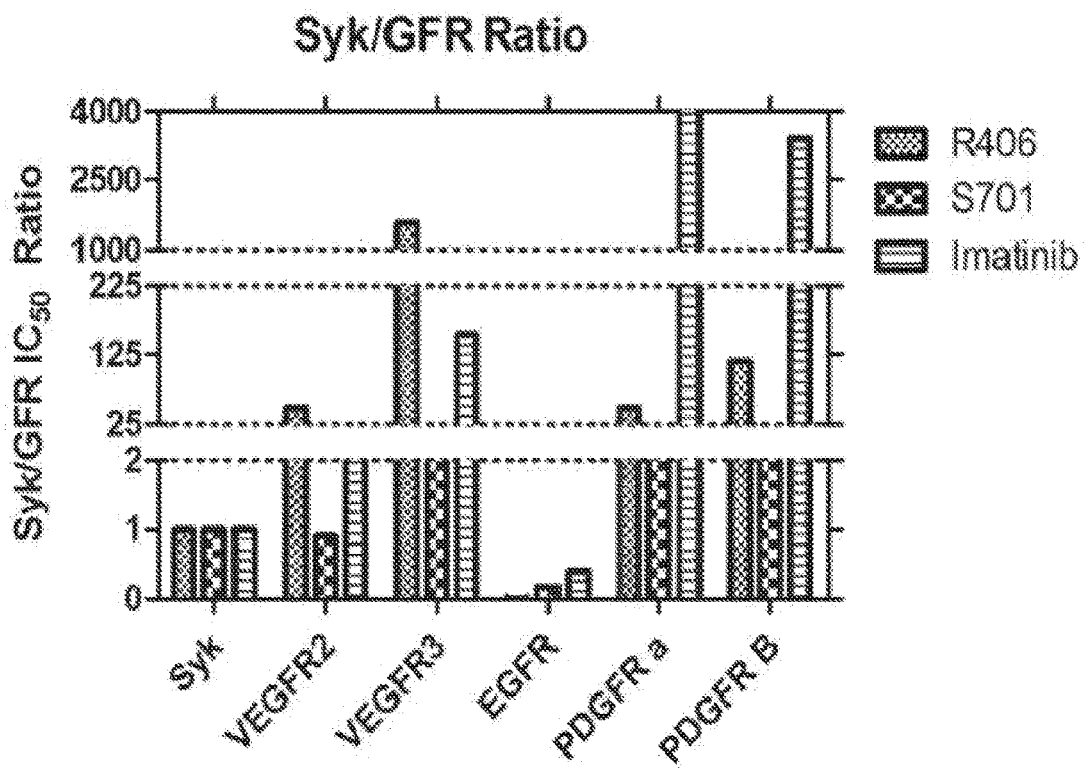
FIG. 8B shows the Affinity Ratios of Syk versus various GFR to compounds R406, newly synthesized S701, and Imatinib.

The activity of a known Syk inhibitor, Imatinib, against these growth factors is shown in FIG. 7C. Imatinib is not as potent an inhibitor to Syk as S701 to Syk, based on their IC$_{50}$ value of maximum inhibition (FIG. 7B by S701 is 581 nM, FIG. 7C by Imatinib is 68936 nM).

Therefore, S701 is far more potent against Syk than Imatinib, and S701 does not inhibit growth factor receptors at concentrations well below its IC$_{50}$ for Syk (FIG. 7B), making it a suitable candidate for further analysis as a treatment for SCD.

Example 4. Additional Compounds Synthesized and Showed Improved Potency and Specificity as Compared to R406

Figure 6A:
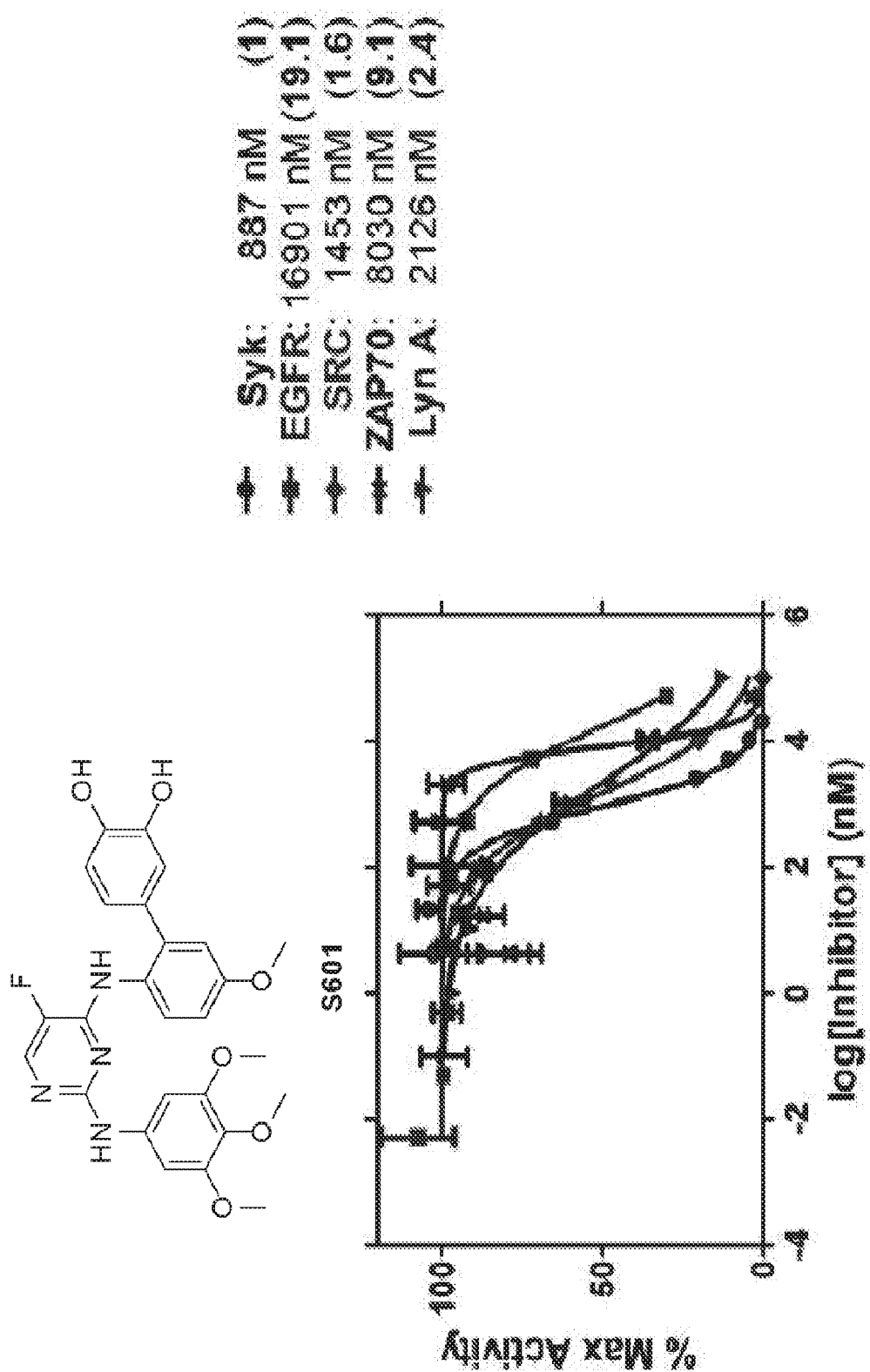
FIGS. 6A and 6B are the results from ADP-Glo assays of S601 (FIG. 6A) and S602 (FIG. 6B) inhibitors against Syk, epidermal growth factor receptor (EGFR), SRC proto-oncogene (SRC), zeta chain-associated protein kinase 70 (ZAP70), and Lyn A. The concentrations shown here are the measured $IC_{50}$ values. The values shown bolded in parentheses are the $IC_{50}$ values normalized to Syk inhibition to show the relative amount needed to inhibit the other listed kinases.
Figure 6B:
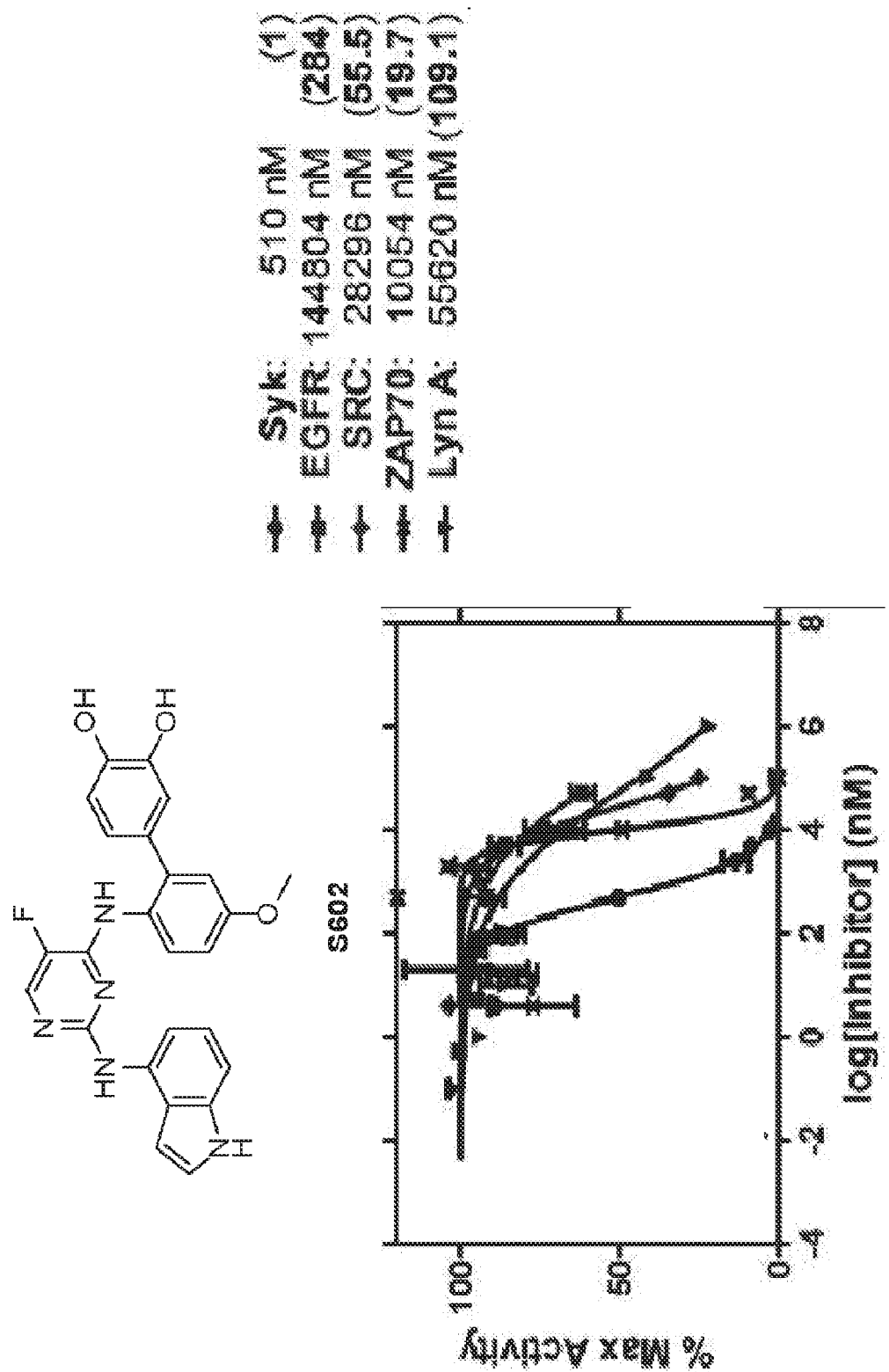

Referring to FIGS. 6A and 6B, using the commercially available ADP-Glo assay the IC$_{50}$ of other synthesized compounds were measured for their inhibition activity against Syk as well as growth factors listed therein, including EGFR, SRC, ZAP 70 and Lyn A. Of notice, S602 compound has even better IC$_{50}$ value for inhibiting Syk as compared to S701, and it needs to be raised to very significantly higher concentrations to have an impact on these grow factor receptors. Thus, S602 is another candidate for treatment of SCD.

Synthesis of S601 and S602

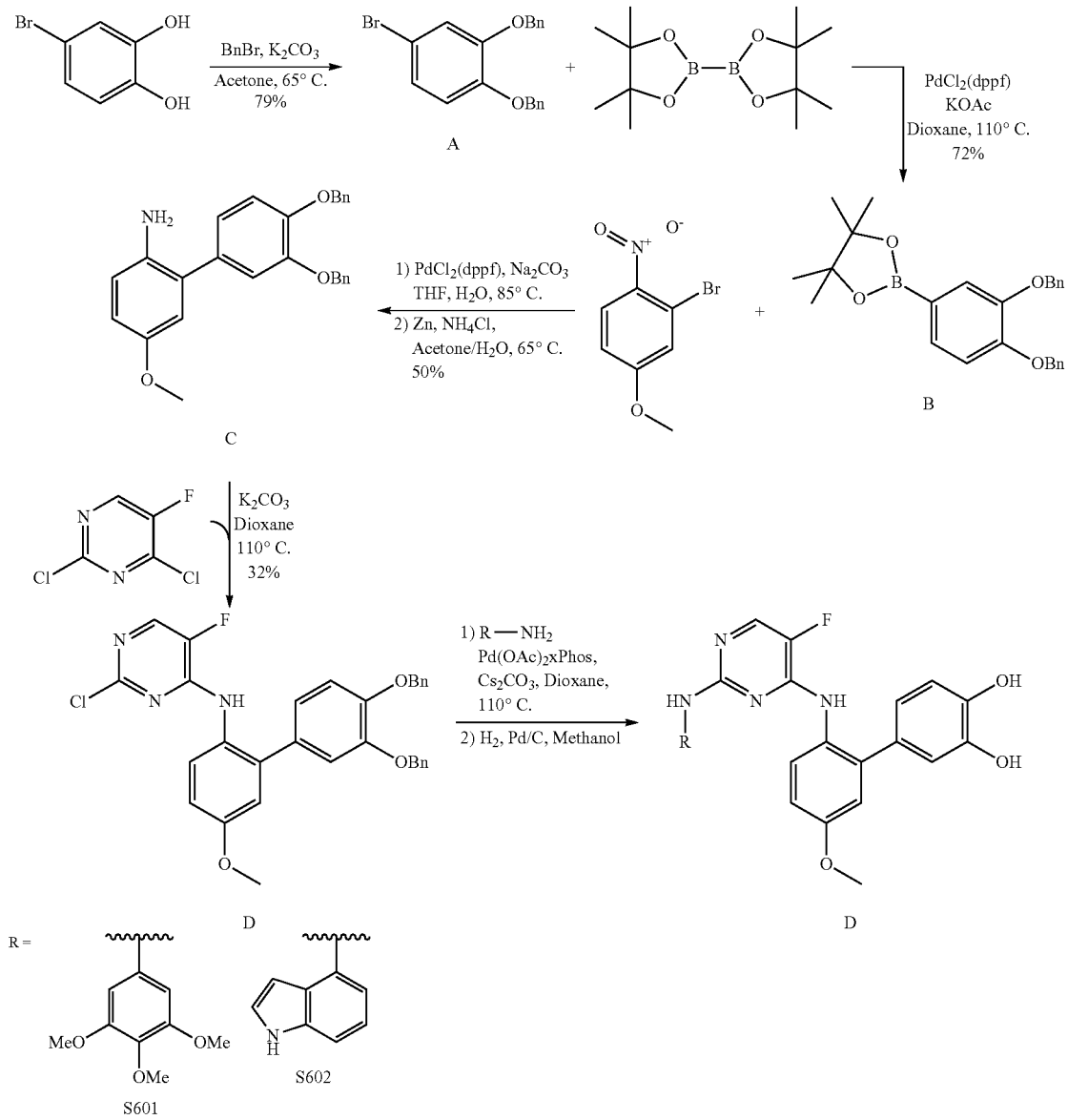

(((4-bromo-1,2-phenylene)bis(oxy))bis(methylene))dibenzene (A)

4-Bromobenzene-1,2-diol (323 mg, 1.71 mmol) was dissolved in 1,4-dioxane (5 mL), $K_2CO_3$ (701 mg, 5.07 mmol) added followed by benzyl bromide (508 µL, 4.27 mmol) and the reaction vessel was fitted with a reflux condenser and the mixture was heated to reflux. After 16 h, the concentrated to dry, and the desired product was isolated by normal phase silica gel chromatography (Hexanes:EtOAc) to give the product as a white solid (500 mg, 79%). $^1$H NMR (500 MHz, $CDCl_3$): δ 7.45-7.29 (m, 2H), 7.07 (d, J=2.3 Hz, 1H), 6.99 (dd, J=8.6, 2.3 Hz, 1H), 6.79 (d, J=8.6 Hz, 1H), 5.12 (s, 4H) ppm; $^{13}$C NMR (125 MHz, $CDCl_3$): δ 150.05, 148.36, 137.09, 136.81, 128.79, 128.75, 128.24, 128.15, 127.57, 127.51, 124.40, 118.36, 116.70, 113.66, 71.71, 71.61 ppm.

2-(3,4-bis(benzyloxy)phenyl)-4,4,5,5-tetramethyl-1,3,2-dioxaborolane (B)

A (156 mg, 0.42 mmol) and bis(pinacolato)diboron (118 mg, 0.46 mmol) were dissolved in 1,4-dioxane (10 mL) in a round bottom flask equipped with a reflux condenser. $PdCl_2(dppf)$ (15 mg, 0.021 mmol) was added followed quickly by KOAc (124 mg, 1.27 mmol) and the reaction mixture was heated to reflux. After 16 h, the reaction mixture was concentrated to dry and the desired product isolated by normal phase silica gel chromatography (Hexanes:EtOAc) to give a white solid (126 mg, 72%). $^1$H NMR (500 MHz, $CDCl_3$): δ 7.51-7.29 (m, 12H), 6.97 (d, J=8.0 Hz, 1H), 5.20 (s, 2H), 5.19 (s, 2H), 1.35 (s, 12H) ppm; $^{13}$C NMR (125 MHz, $CDCl_3$): δ 151.91, 148.65, 137.63, 137.32, 129.36, 128.64, 128.57, 127.92, 127.89, 127.67, 127.35, 120.73, 114.13, 83.85, 71.46, 70.93, 25.06 ppm.

3',4'-bis(benzyloxy)-5-methoxy-[1,1'-biphenyl]-2-amine (C)

B (126 mg, 0.31 mmol) and 2-bromo-4-methoxy-1-nitrobenzene (65 mg, 0.28 mmol) were dissolved in THF (5 mL) followed by addition of $H_2O$ (2 mL) in a round bottom flask equipped with a reflux condenser. $PdCl_2(dppf)$ (10 mg, 0.014 mmol) was added followed quickly by $Na_2CO_3$ (178 mg, 1.68 mmol) and the reaction mixture was heated to reflux. After 16 h, the reaction mixture was concentrated to dry and the desired product isolated by normal phase silica gel chromatography (Hexanes:EtOAc) to give an orange oil (94 mg, 69%). The orange oil was dissolved in Acetone (6 mL) and NH$_4$Cl (137 mg, 2.55 mmol) was added. After 5 min, Zn powder (139 mg, 2.13 mmol) was added and the reaction vessel was fitted with a reflux condenser and the mixture stirred at reflux. After 2 h, the mixture was cooled to RT and concentrated to dry. The resulting mixture was suspended in 1 M NaOH (50 mL), placed into a separatory funnel and extracted with DCM (3×25 mL). The combined organic layers were dried over Na$_2$SO$_4$ and concentrated to dry. The desired product was isolated by normal phase silica gel chromatography (Hexanes:EtOAc) to give a solid (64 mg, 73%). $^1$H NMR (500 MHz, CDCl$_3$): δ 7.50-7.29 (m, 12H), 7.05 (d, J=2.0 Hz, 1H), 7.01 (d, J=8.2 Hz, 1H), 6.96 (dd, J=8.3, 2.0 Hz, 1H), 6.74 (dd, J=8.6, 2.8 Hz, 1H), 6.70-6.67 (m, 2H), 5.22 (s, 2H), 5.20 (s, 2H), 3.75 (s, 3H), 3.42 (s, 2H) ppm; $^{13}$C NMR (125 MHz, CDCl$_3$): δ 152.83, 148.91, 148.41, 137.48, 137.34, 132.90, 128.72, 128.68, 128.51, 128.03, 127.99, 127.58, 127.47, 122.18, 117.03, 116.10, 115.80, 115.36, 114.40, 71.49, 71.33, 55.98, 25.81 ppm.

N-(3',4'-bis(benzyloxy)-5-methoxy-[1,1'-biphenyl]-2-yl)-2-chloro-5-fluoropyrimidin-4-amine (D)

C (40 mg, 0.097 mmol) was dissolved in 1,4-dioxane (5 mL), K$_2$CO$_3$ (40 mg, 0.292 mmol) added followed by 2,4-dichloro-5-fluoropyrimidine (24 mg, 0.146 mmol) and the reaction vessel was fitted with a reflux condenser and the mixture was heated to reflux. After 16 h, the mixture was concentrated to dry, and the desired product was isolated by reverse phase silica gel chromatography using an HPLC (20 mM NH$_4$OAc:ACN) to give the product as an oil (17 mg, 32%). $^1$H NMR (500 MHz, CDCl$_3$): δ 8.06 (d, J=9.0 Hz, 1H), 7.93 (d, J=2.7 Hz, 1H), 7.48-7.27 (m, 10H), 7.01 (d, J=8.3 Hz, 1H), 6.95 (dd, J=9.1, 2.9 Hz, 1H), 6.93 (d, J=2.3 Hz, 1H), 6.87 (dd, J=8.1, 2.0 Hz, 1H), 6.83 (s, 1H), 6.79 (d, J=3.0 Hz, 1H), 5.22 (s, 2H), 5.12 (s, 2H), 3.82 (s, 3H) ppm; $^{13}$C NMR (125 MHz, CDCl$_3$): δ 157.01, 154.63, 151.40, 151.33, 149.42, 149.10, 146.32, 144.26, 140.72, 140.56, 137.17, 137.08, 135.52, 130.99, 128.77, 128.71, 128.14, 128.10, 127.50, 127.34, 126.91, 124.05, 122.18, 115.90, 115.35, 113.63, 71.48, 55.76 ppm.

2'-((5-fluoro-2-((3,4,5-trimethoxyphenyl)amino)pyrimidin-4-yl)amino)-5'-methoxy-[1,1'-biphenyl]-3,4-diol (S601)

D (30 mg, 0.055 mmol), 3,4,5-trimethoxyaniline (11 mg, 0.061 mmol), Pd(OAc)$_2$ (0.62 mg, 0.003 mmol), XPhos (3 mg, 0.005 mmol), and CsCO$_3$ (36 mg, 0.11 mmol) were added to a vial fitted with a screw cap with a septa. The reaction mixture was purged with a gentle stream of N$_2$ with stirring. After a 15 min purge, the exit needle was removed and 1,4-dioxane (anhydrous, ZerO$_2$®, 1 mL) added and the reaction mixture stirred at 110° C. under pressure of N$_2$. After 16 h, the reaction mixture was concentrated to dry, and the desired product isolated by normal phase silica gel chromatography (Hexanes:EtOAc) to give a brown oil (39 mg, 99%). The brown oil was dissolved in methanol (5 mL), and Pd/C (10%, 4 mg) was added. The reaction vessel was purged with H$_2$ for 10 min, then sealed and the reaction proceeded under H$_2$ atmosphere. After 16 h, the Pd/C was filtered over Celite and rinsed with methanol (3×5 mL) and DCM (3×5 mL). The combined rinses were dried in vacuo, and the desired product was isolated by reverse phase silica gel chromatography using an HPLC (20 mM NH$_4$OAc:ACN) to give the product as an oil (16 mg, 55%). $^1$H NMR (500 MHz, CD$_3$OD): δ 7.76 (d, J=3.9 Hz, 1H), 7.49 (d, J=8.6 Hz, 1H), 6.89 (dd, J=8.7, 3.1 Hz, 6.87-6.85 (m, 3H), 6.80 (d, J=2.1 Hz, 1H), 6.73 (d, J=8.1 Hz, 1H), 6.68 (dd, J=8.0, 2.0 Hz, 1H), 3.84 (s, 3H), 3.69 (s, 3H), 3.57 (s, 6H) ppm; $^{13}$C NMR (125 MHz, CDCl$_3$): δ 159.50, 154.38, 146.32, 146.17, 141.44, 138.63, 133.76, 132.49, 129.92, 129.24, 121.63, 117.12, 117.12, 116.74, 116.38, 113.97, 113.96, 97.93, 61.39, 56.51, 56.10 ppm; LC-MS m/z: 509.2 [M+H]$^+$.

2'-((2-((1H-indol-4-yl)amino)-5-fluoropyrimidin-4-yl)amino)-5'-methoxy-[1,1'-biphenyl]-3,4-diol (S602)

D (15 mg, 0.028 mmol), 1H-indol-4-amine (3 mg, 0.025 mmol), XPhos Pd G4 (1 mg, 0.0014 mmol), XPhos (2 mg, 0.003 mmol), and CsCO$_3$ (18 mg, 0.055 mmol) were added to a vial fitted with a screw cap with a septa. The reaction mixture was purged with a gentle stream of N$_2$ with stirring. After a 15 min purge, the exit needle was removed and 1,4-dioxane (anhydrous, ZerO$_2$®, 1 mL) added and the reaction mixture stirred at 110° C. under pressure of N$_2$. After 16 h, the reaction mixture was concentrated to dry, and the desired product isolated by normal phase silica gel chromatography (Hexanes:EtOAc) to give a brown oil. The brown oil was dissolved in methanol (5 mL) and Pd/C (10%, 4 mg) was added. The reaction vessel was purged with H$_2$ for 10 min, then sealed and the reaction proceeded under H$_2$ atmosphere. After 16 h, the Pd/C was filtered over Celite and rinsed with methanol (3×5 mL) and DCM (3×5 mL). The combined rinses were dried in vacuo, and the desired product was isolated by reverse phase silica gel chromatography using an HPLC (20 mM NH$_4$OAc:ACN) to give the product as white solid (2 mg, 16%). LC-MS m/z: 458.1 [M+H]$^+$.

Example 5. In Vitro Phosphorylation Studies Show that S701 Inhibits Band 3 Tyrosine Phosphorylation Induced in Healthy Donor RBCs by Treatment with OV Referring to FIG. 2A, the in vitro IC$_{50}$ of S701 against Syk phosphorylation of Band 3 is approximately 5 µM, 10-fold higher than the IC$_{50}$ measured in our cell-free assay. The measured IC$_{50}$ values recorded were 59 nM and 581 nM respectively Without being limited by any theory, the difference in IC$_{50}$ values between the biochemical assay and our in vitro assay is possibly due to the passive diffusion of S701 into the RBC, which is common for all therapeutics seeking to gain entry into RBCs.

Example 6. Hemolysis Inhibition by S701

Data from FIG. 3A had the background subtracted and each treatment group was normalized to the respective phosphatase inhibitor in the absence of S701 to accurately reflect inhibition of Hb release as a result of treatment with 5 µM S701. Further studies in FIG. 3B shows that 5 µM S701 inhibits hemolysis resulting from treatment with known phosphatase inhibitors OV (25%), Diamide (50%), and Phenylhydrazine (44%) in healthy donor human RBCs.

Example 7. Human SCD Patient Sample Analysis in the Presence of S701

Figure 4A:
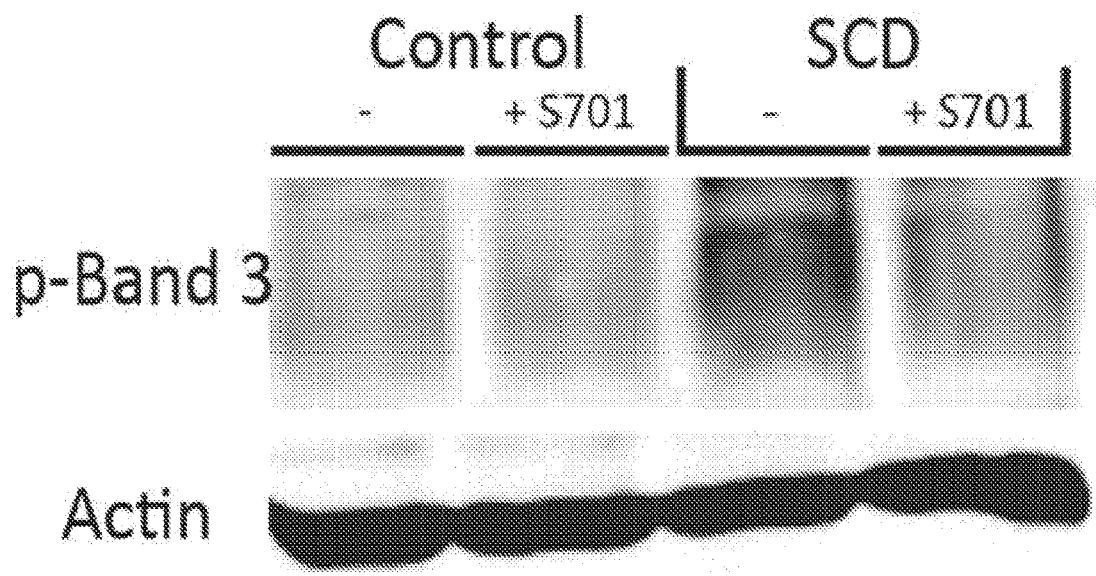
FIG. 4A is the Western blot of human control and sickle cell disease (SCD) RBC lysates before and after treatment with 1 μM S701 and shows a notable decrease in phosphorylated Band 3. A general anti-pY antibody was used to show phosphorylated Band 3. Actin was used as a loading control.

FIG. 4A shows the concentration of free plasma hemoglobin in SCD patient samples was decreased by 47% in the presence of 1 µM S701.

Example 8. Microparticle Release is Reduced in the Presence of S701

1 µM S701 concentration was used to avoid higher concentrations of inhibitor causing increased hemolysis.

Figure 4B:
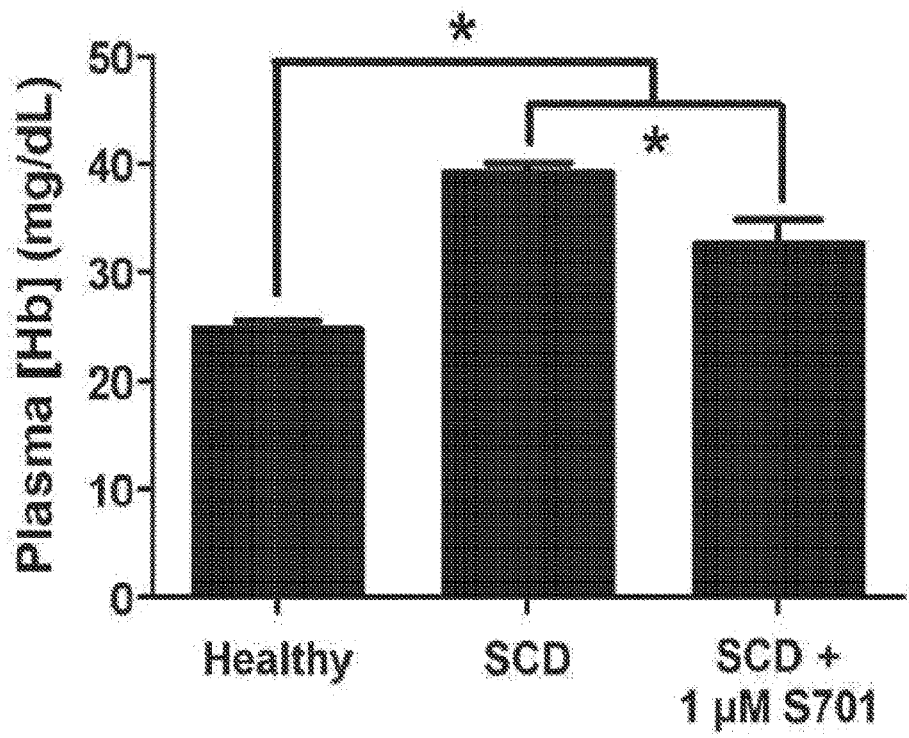
FIG. 4B is the hemoglobin (Hb) release in healthy human sample and SCD patient samples with or without treatment with 1 μM S701 shown by plasma Hb concentration, run in triplicate.
Figure 4C:
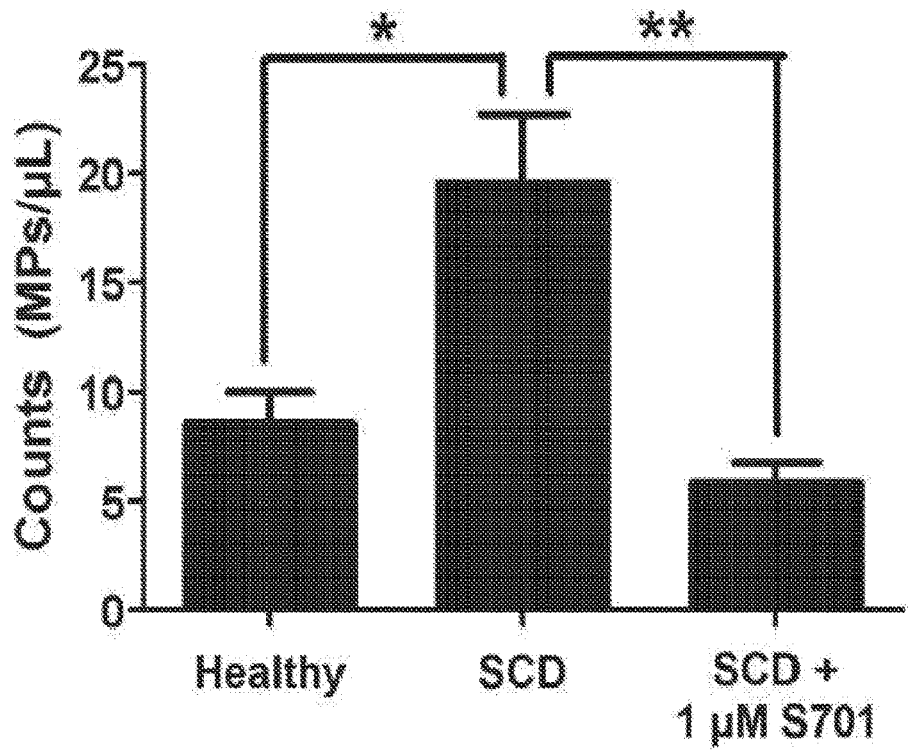
FIG. 4C is the MP count from a healthy human sample and SCD patient samples with or without treatment with 1 μM S701, run in triplicate. (B) and (C) are plotted as mean±SEM and analyzed by one-way ANOVA with Tukey's post test. *p<0.05, **p<0.01.

In healthy donor samples, the number of MPs present in 1 μL of plasma was measured as seven, whereas in SCD patient samples that number rose to 18. However, when SCD patient samples were incubated with 1 μM S701, the number of MPs released per μL of plasma decreased back down to five. FIG. 4B shows the microparticle release reduction in the presence of S701 treated SCD samples.

Example 9. Improved RBC Flow Velocity in the Presence of S701 in SCD Samples

Referring to FIG. 5, when S701 is incubated at concentrations as low as 50 nM with SCD patient RBCs at various levels of oxygenation, there is a recovery of flexibility as shown by the increased RBC velocity through a 5 μm tube simulating a blood vessel capillary. This indicates that S701 compound treatment to SCD samples improved RBC flexibility, which is a major concern for SCD patients. The restriction of RBC flow through capillaries and the resulting decrease in oxygen delivery to vital organs is the most common and detrimental symptom of SCD. Recovery of the ability of RBCs to pass through blood vessels validates S701 as a candidate for SCD treatment.

S701 was validated as an effective inhibitor for Syk phosphorylation in both cell-free and SCD-based systems. The novel Syk inhibitor S701, and its derivatives, for examples, other compounds like S602 or S601, can be used as an effective treatment option against SCD to alleviate the effects of vaso-occlusive crises without the concomitant inhibition of growth seen with Imatinib or other approved drugs, and likely to be shown with Fostamatinib, if it were to be used in adolescents.

It is also likely that improvements in computer-guided design may lead to the enhancement of efficacy and improve the selectivity and pharmacokinetic (PK) properties of next-generation Syk inhibitors.

Numbered Embodiments

Embodiment 1 relates to a compound of formula (I):

(I)

wherein:

$R^1$ is substituted or unsubstituted aryl, or substituted or unsubstituted heteroaryl;

$R^2$ is halogen; and $R^3$ is substituted phenyl or —C(O)-substituted phenyl;

or a pharmaceutically acceptable salt thereof.

Embodiment 2 relates to the compound of Embodiment 1, wherein $R^1$ is phenyl.

Embodiment 3 relates to the compound of Embodiment 1, wherein $R^1$ is a bicyclic heteroaryl.

Embodiment 4 relates to the compound of any of Embodiments 1-3, wherein $R^1$ is substituted with one, two or three substituents.

Embodiment 5 relates to the compound of Embodiment 1, wherein $R^1$ is

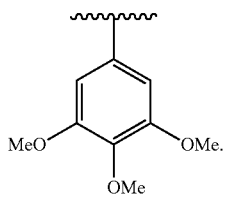

Embodiment 6 relates to the compound of Embodiment 1 or 3, wherein $R^1$ is an optionally substituted indole.

Embodiment 7 relates to the compound of Embodiment 1 or 3, wherein $R^1$ is an optionally substituted isoindole.

Embodiment 8 relates to the compound of Embodiment 1 or 3, wherein $R^1$ is an optionally substituted benzimidazole.

Embodiment 9 relates to the compound of Embodiment 1 or 3, wherein $R^1$ is substituted with alkylene-$NH_2$.

Embodiment 10 relates to the compound of Embodiment 1, or 3, wherein $R^1$ is substituted with ethylenediamine.

Embodiment 11 relates to the compound of Embodiment 1, or 3, wherein $R^1$ is

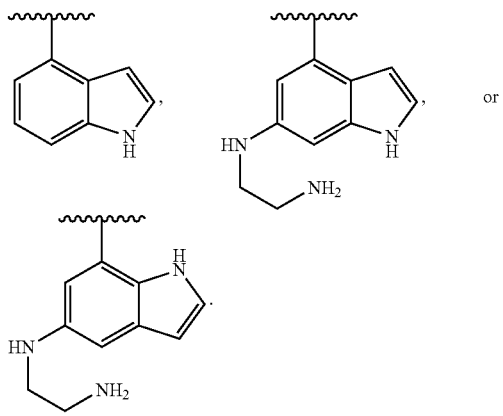

Embodiment 12 relates to the compound of Embodiments 1, 2, 3 or 5 wherein $R^2$ is F.

Embodiment 13 relates to the compound of Embodiments 1-12, $R^3$ is substituted with two or three substituents.

Embodiment 14 relates to the compound of Embodiment 13, wherein the substituents are independently $OR^4$ or substituted phenyl, and $R^4$ is independently H, methyl, or cyclohexylamine.

Embodiment 15 relates to the compound of Embodiments 1, 2, 3 or 5, wherein $R^3$ is

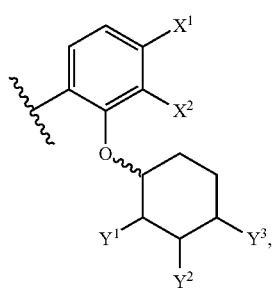

wherein $X^1$, $X^2$, are independently $NH_2$, OH, or SH and $Y^1$, $Y^2$, and $Y^3$ independently H, $NH_2$, OH, or SH, and two of $Y^1$, $Y^2$, and $Y^3$ are H Embodiment 16 relates to the compound of Embodiments 1, 2, 3, or 5, wherein $R^3$ is selected from

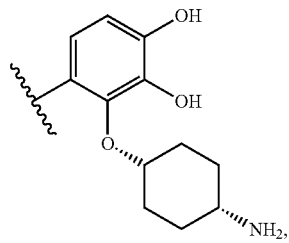

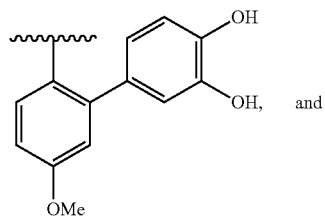
and

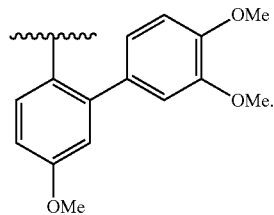

Embodiment 17 relates to the compound of Embodiments 1, 2, 3, or 5, wherein $R^3$ is

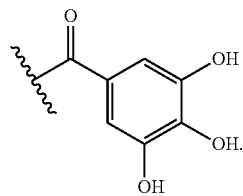 [SMILES: *C(=O)c1cc(O)c(O)c(O)c1]

Embodiment 18 relates to the compound of Embodiment 1, wherein the compound of formula (I) is selected from

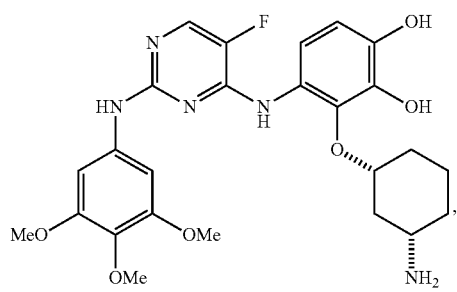

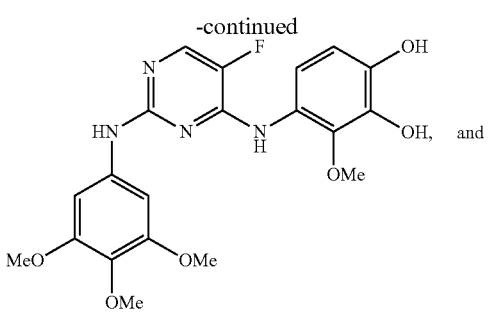
and

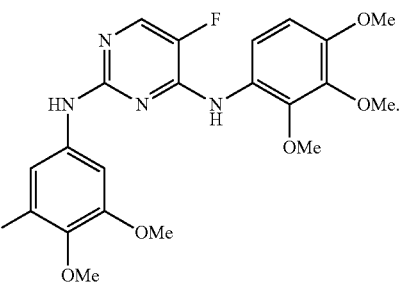

Embodiment 19 relates to the compound of Embodiment 1, wherein the compound of formula (I) is selected from

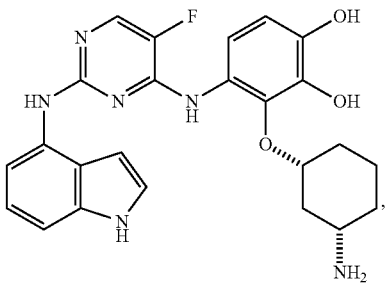

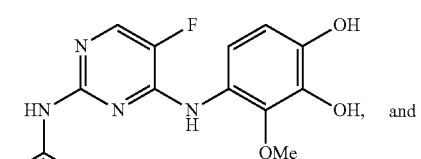
and

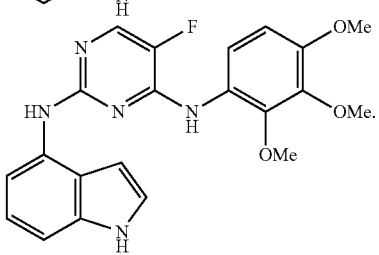

Embodiment 20 relates to the compound of Embodiment 1, wherein the compound of formula (I) is selected from

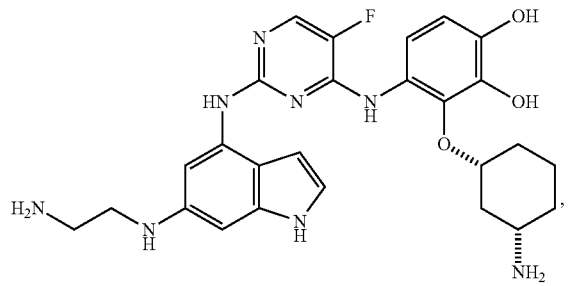

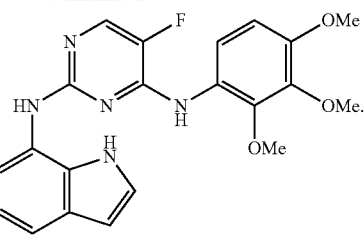

Embodiment 22 relates to the compound of Embodiment 1, wherein the compound of formula (I) is

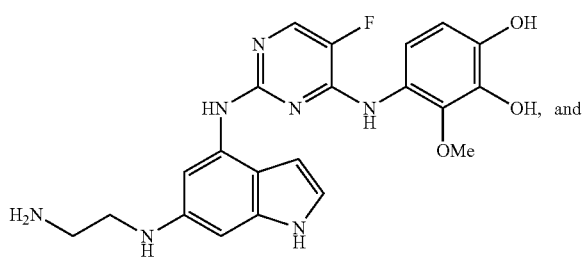

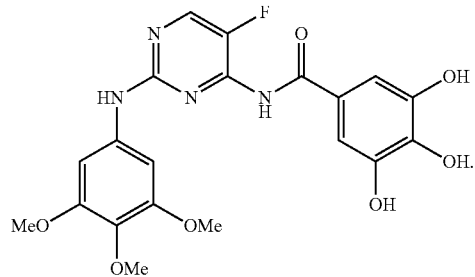 [SMILES: COc1cc(Nc2ncc(F)c(NC(=O)c3cc(O)c(O)c(O)c3)n2)cc(OC)c1OC]

Embodiment 23 relates to the compound of Embodiment 1, wherein the compound of formula (I) is

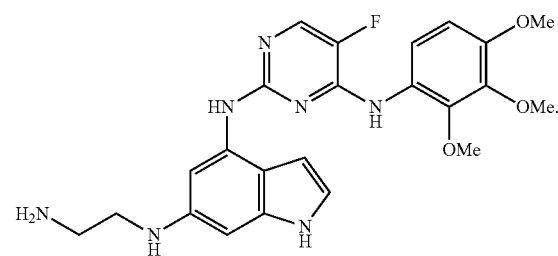

Embodiment 21 relates to the compound of Embodiment 1, wherein the compound of formula (I) is selected from

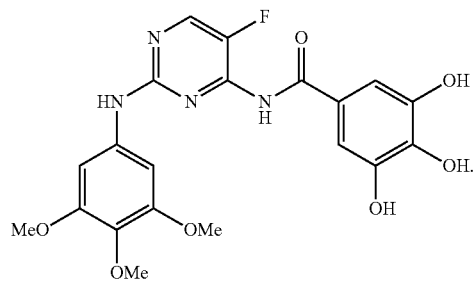 [SMILES: COc1cc(Nc2ncc(F)c(NC(=O)c3cc(O)c(O)c(O)c3)n2)cc(OC)c1OC]

Embodiment 24 relates to the compound of Embodiment 1, wherein the compound of formula (I) is selected from

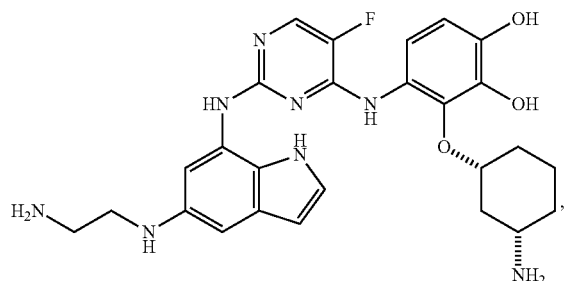

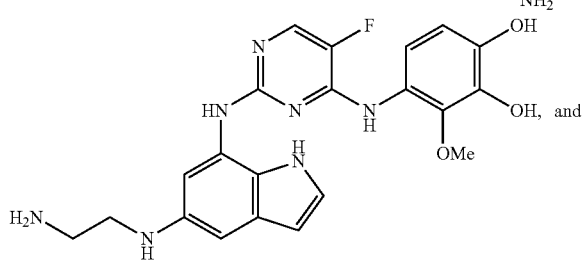

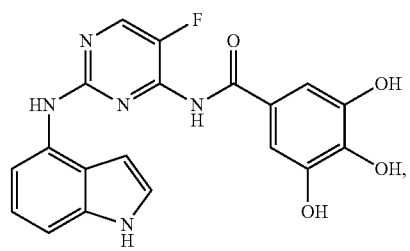

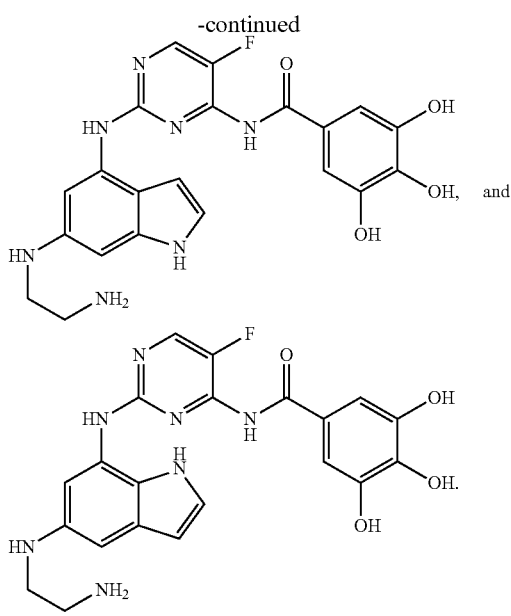

Embodiment 25 relates to Embodiment 18 relates to the compound of Embodiment 1, pharmaceutical composition comprising a compound of any of Embodiments 1-24 and a pharmaceutical acceptable carrier.

Embodiment 26 relates to a method of treating sickle cell disease in a subject suffering therefrom, which method comprises administering to the subject a therapeutically effective amount of a compound of any of Embodiments 1-24 or a pharmaceutical composition comprising same and a pharmaceutically acceptable carrier, whereupon the subject is treated for sickle cell disease.

Embodiment 27 relates to the method of Embodiment 26, wherein the subject is a child.

Embodiment 28 relates to a method of treating sickle cell disease in a subject suffering therefrom, which method comprises inhibiting erythrocyte band 3 tyrosine phosphorylation with (i) a compound having a first affinity of less than 1 μM measured by $IC_{50}$ for inhibition of a band 3 tyrosine kinase and a second affinity measured by $IC_{50}$ for inhibition of growth factor receptor kinases, wherein the second affinity is at least five times lower than the first affinity, or (ii) a pharmaceutical composition thereof.

Embodiments 29 relates to the method of Embodiment 28, wherein the compound has one or more functional groups that can occupy a cavity, which is present in band 3 tyrosine kinase's ATP-binding pocket and which is not present in growth factor receptor tyrosine kinases Embodiment 30 relates to the method of Embodiment 28, wherein the compound has at least about 15-fold to 250-fold more specificity to said band 3 tyrosine kinase than to a growth factor receptor tyrosine kinase measured by said first affinity and said second affinity, respectively.

Embodiment 31 relates to the method of Embodiment 28, wherein the growth factor receptor kinase is selected from the group consisting of epidermal growth factor receptor (EGFR), SRC proto-oncogene, non-receptor tyrosine kinase (SRC), zeta chain-associated protein kinase 70 (ZAP70), insulin-like growth factor receptor (IGFR), and LynA.

Embodiment 32 relates to the method of Embodiment 28, wherein the growth factor receptor kinase is selected from the group consisting of vascular endothelial growth factor receptor 2 (VEGFR2), vascular endothelial growth factor receptor 3 (VEGFR3), platelet-derived growth factor receptor A (PDGFR A), and platelet-derived growth factor receptor B (PDGFR B).

Embodiment 33 relates to the method of Embodiment 28, wherein the band 3 tyrosine kinase is spleen tyrosine kinase (SYK).

Embodiment 34 relates to the method of Embodiment 28, wherein the compound is a compound of any one of Embodiments 1-24.

Embodiment 35 relates to the method of Embodiment 34, wherein the growth factor receptor tyrosine kinase is EGFR.

Embodiment 36 relates to the method of Embodiment 28, wherein the compound reduces hemoglobin (Hb) release into the plasma as measured by plasma Hb concentration.

Embodiment 37 relates to the method of Embodiment 28, wherein the compound reduces erythrocyte-derived microparticle counts (MP) compared to an untreated subject.

Embodiment 38 relates to the method of Embodiment 28, wherein the compound increases the subject's red blood cell (RBC) flow velocity in a dose-responsive manner.

Embodiment 39 relates to the method of Embodiment 28, wherein the compound has one or more functional groups that can occupy a cavity, which is present in band 3 tyrosine kinase's ATP-binding pocket and which is not present in the growth factor receptor tyrosine kinases.

Embodiment 40 relates to the method of Embodiment 28, wherein the compound does not inhibit a growth-related tyrosine kinase selected from the group consisting of EGFR, SRC, ZAP70, IGFR and LynA.

Embodiment 41 relates to the method of Embodiment 28, wherein the compound does not inhibit a growth-related tyrosine kinase selected from the group consisting of VEGFR2, VEGFR3, PDGFR A, and PDGFR B.

Embodiment 42 relates to the method of Embodiment 28, wherein the compound inhibits SYK.

Embodiment 43 relates to the method of any one of Embodiments 28-42, wherein the subject is a child.

INCORPORATION BY REFERENCE

All the patents, patent application publications, journal articles, books and other publications cited herein are hereby incorporated by reference.

EQUIVALENTS

Those skilled in the art will recognize or be able to ascertain using no more than routine experimentation, many equivalents to the various embodiments of the disclosure described herein. Such equivalents are encompassed by the following claims.

We claim:

1. A compound of formula (I):

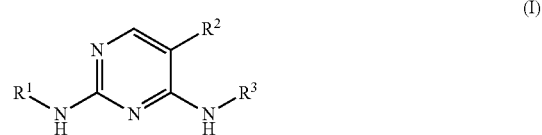

wherein:

R¹ is substituted or unsubstituted aryl, or substituted or unsubstituted heteroaryl;

R² is halogen; and

R³ is

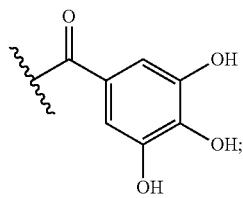 [SMILES: *C(=O)c1cc(O)c(O)c(O)c1]

or a pharmaceutically acceptable salt thereof.

2. The compound of claim 1, wherein R¹ is

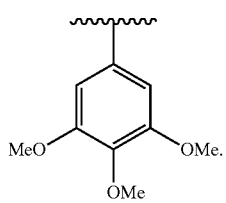

3. The compound of claim 1 wherein R¹ is

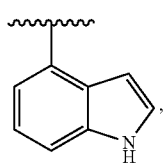 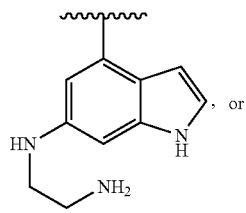, or

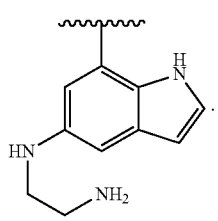.

4. The compound of claim 1, wherein R² is F.

5. The compound of claim 1, wherein the compound of formula (I) is

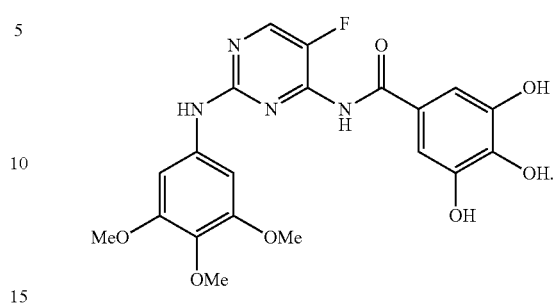

6. The compound of claim 1, wherein the compound of formula (I) is selected from

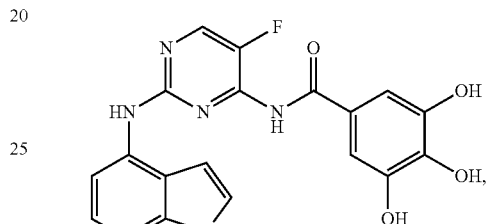

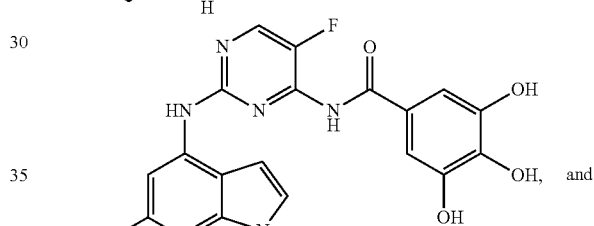, and

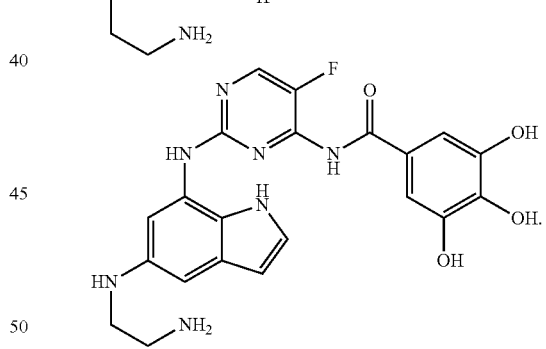

7. A pharmaceutical composition comprising a compound of claim 1 and a pharmaceutical acceptable carrier.

8. A method of treating sickle cell disease in a subject suffering therefrom, which method comprises administering to the subject a therapeutically effective amount of a compound of claim 1 or a pharmaceutical composition comprising same and a pharmaceutically acceptable carrier.

* * * * *